United States Patent
John Wilson et al.

(10) Patent No.: US 11,324,033 B2
(45) Date of Patent: May 3, 2022

(54) PHYSICAL DOWNLINK SHARED CHANNEL RECEPTION WHEN PHYSICAL DOWNLINK CONTROL CHANNEL WITH DIFFERENT SPATIAL QUASI-COLOCATION ASSUMPTIONS ARE MAPPED TO THE SAME CONTROL RESOURCE SET

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Yan Zhou, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/373,923

(22) Filed: Apr. 3, 2019

(65) Prior Publication Data
US 2019/0313440 A1    Oct. 10, 2019

Related U.S. Application Data

(60) Provisional application No. 62/653,819, filed on Apr. 6, 2018.

(51) Int. Cl.
*H04W 72/14* (2009.01)
*H04W 72/04* (2009.01)
(Continued)

(52) U.S. Cl.
CPC ......... *H04W 72/14* (2013.01); *H04J 11/0079* (2013.01); *H04L 27/2666* (2013.01); *H04W 72/042* (2013.01); *H04W 72/1289* (2013.01)

(58) Field of Classification Search
None
See application file for complete search history.

(56) References Cited

U.S. PATENT DOCUMENTS

| 9,131,491 B2 * | 9/2015 | Lee | ......................... H04L 5/0055 |
| 10,567,058 B2 * | 2/2020 | Guo | ...................... H04W 24/10 |

(Continued)

FOREIGN PATENT DOCUMENTS

WO    WO-2018045307 A1    3/2018

OTHER PUBLICATIONS

International Search Report and Written Opinion—PCT/US2019/025865—ISA/EPO—Jun. 13, 2019.

(Continued)

*Primary Examiner* — Christopher T Wyllie
(74) *Attorney, Agent, or Firm* — Holland & Hart LLP

(57) ABSTRACT

Methods, systems, and devices for wireless communications are described. A user equipment (UE) may be configured to monitor, via a receive beam, a first transmission time interval (TTI) of a plurality of different TTIs for a control resource set. The UE may decode the control resource set to obtain a first grant and a second grant. Upon decoding the control resource set, the UE may determine that the first grant and the second grant are associated with different parameters. In some cases, the parameters may be spatial quasi-colocation (QCL) assumptions mapped to the control resource set. The UE may decode, resources of a shared data channel indicated in at least one of the first grant and the second grant. In some cases, the UE may decode the resources during at least one of the first TTI and a second TTI of the plurality different TTIs.

28 Claims, 20 Drawing Sheets

(51) Int. Cl.
  *H04J 11/00* (2006.01)
  *H04L 27/26* (2006.01)
  *H04W 72/12* (2009.01)

(56) References Cited

U.S. PATENT DOCUMENTS

| | | | | |
|---|---|---|---|---|
| 2010/0265870 A1* | 10/2010 | Cai | H04W 72/042 | 370/312 |
| 2011/0274060 A1* | 11/2011 | Luo | H04L 5/0094 | 370/329 |
| 2012/0113884 A1* | 5/2012 | Park | H04L 5/0094 | 370/312 |
| 2012/0257552 A1* | 10/2012 | Chen | H04L 5/001 | 370/280 |
| 2013/0044623 A1* | 2/2013 | Speight | H04B 7/15528 | 370/252 |
| 2013/0128857 A1* | 5/2013 | Nakao | H04L 5/0032 | 370/329 |
| 2013/0242882 A1* | 9/2013 | Blankenship | H04L 5/0041 | 370/329 |
| 2014/0086152 A1* | 3/2014 | Bontu | H04W 4/70 | 370/329 |
| 2014/0105191 A1* | 4/2014 | Yang | H04L 1/1867 | 370/336 |
| 2014/0133452 A1* | 5/2014 | Nogami | H04L 5/0091 | 370/329 |
| 2014/0301299 A1* | 10/2014 | Wu | H04L 5/0053 | 370/329 |
| 2015/0296455 A1* | 10/2015 | Yamazaki | H04W 52/0261 | 370/311 |
| 2015/0373695 A1* | 12/2015 | Skarby | H04L 5/0053 | 370/329 |
| 2016/0007357 A1* | 1/2016 | Yano | H04L 1/0039 | 370/329 |
| 2016/0157213 A1* | 6/2016 | Takeda | H04L 1/1822 | 370/329 |
| 2016/0226538 A1* | 8/2016 | Kim | H04B 1/123 | |
| 2016/0308653 A1* | 10/2016 | Dinan | H04L 5/0032 | |
| 2017/0013565 A1* | 1/2017 | Pelletier | H04W 52/365 | |
| 2017/0251466 A1* | 8/2017 | Astely | H04L 5/0055 | |
| 2018/0083680 A1* | 3/2018 | Guo | H04L 5/0048 | |
| 2018/0192405 A1* | 7/2018 | Gong | H04W 88/025 | |
| 2018/0279135 A1* | 9/2018 | Hwang | H04L 5/0094 | |
| 2018/0288749 A1* | 10/2018 | Sun | H04L 5/0048 | |
| 2018/0376454 A1* | 12/2018 | Strom | H04L 5/0048 | |
| 2019/0020506 A1* | 1/2019 | Cheng | H04L 1/1819 | |
| 2019/0069285 A1* | 2/2019 | Chandrasekhar | H04B 7/0695 | |
| 2019/0104500 A1* | 4/2019 | Reial | H04L 5/0091 | |
| 2019/0110244 A1* | 4/2019 | Shih | H04W 48/16 | |
| 2019/0149383 A1* | 5/2019 | Ko | H04L 27/2666 | 370/329 |
| 2019/0158348 A1* | 5/2019 | Liou | H04W 76/19 | |
| 2019/0159100 A1* | 5/2019 | Liou | H04B 7/088 | |
| 2019/0222284 A1* | 7/2019 | Huang | H04L 5/0053 | |
| 2019/0253941 A1* | 8/2019 | Cirik | H04W 36/0077 | |
| 2019/0254045 A1* | 8/2019 | Sadiq | H04W 72/0446 | |
| 2019/0260445 A1* | 8/2019 | John Wilson | H04B 7/086 | |
| 2019/0260524 A1* | 8/2019 | Nam | H04L 5/0091 | |
| 2019/0261195 A1* | 8/2019 | Cheng | H04W 8/22 | |
| 2019/0261281 A1* | 8/2019 | Jung | H04W 52/50 | |
| 2019/0296956 A1* | 9/2019 | John Wilson | H04L 25/0224 | |
| 2019/0297603 A1* | 9/2019 | Guo | H04B 7/0695 | |
| 2019/0306847 A1* | 10/2019 | Seo | H04B 7/0417 | |
| 2019/0313440 A1* | 10/2019 | John Wilson | H04B 7/0695 | |
| 2020/0037293 A1* | 1/2020 | Reial | H04L 5/0023 | |
| 2020/0119839 A1* | 4/2020 | Jo | H04B 7/06 | |
| 2020/0119869 A1* | 4/2020 | Taherzadeh Boroujeni | H04B 7/0695 | |

OTHER PUBLICATIONS

Qualcomm Incorporated: "Remaining Details on QCL", 3GPP Draft, 3GPP TSG RAN WG1 Meeting #91, R1-1720672, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 27, 2017-Dec. 1, 2017, Nov. 18, 2017 (Nov. 18, 2017), XP051370133, pp. 1-9, Retrieved from the Internet: URL: http://www.3gpp.org/ftp/tsg_ran/WG1_RL1/TSGR1_91/Docs/[retrieved on Nov. 18, 2017] sections 1-3.

* cited by examiner

PHYSICAL DOWNLINK SHARED CHANNEL RECEPTION WHEN PHYSICAL DOWNLINK CONTROL CHANNEL WITH DIFFERENT SPATIAL QUASI-COLOCATION ASSUMPTIONS ARE MAPPED TO THE SAME CONTROL RESOURCE SET

CROSS REFERENCES

The present application for patent claims the benefit of U.S. Provisional Patent Application No. 62/653,819 by JOHN WILSON, et al., entitled "PHYSICAL DOWNLINK SHARED CHANNEL RECEPTION WHEN PHYSICAL DOWNLINK CONTROL CHANNEL WITH DIFFERENT SPATIAL QUASI-COLOCATION ASSUMPTIONS ARE MAPPED TO THE SAME CONTROL RESOURCE SET," filed Apr. 6, 2018, assigned to the assignee hereof, and expressly incorporated herein.

BACKGROUND

The following relates generally to wireless communication and more specifically to physical downlink shared channel (PDSCH) reception when physical downlink control channel (PDCCH) with different spatial quasi-colocation (QCL) assumptions are mapped to the same control resource set (CORESET).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may communicate with a UE using multiple antennas. Data streams may be mapped to one or more antennas using antenna ports, and each of these antenna ports may be associated with a reference signal (e.g., which may allow a receiver to distinguish data streams associated with different antenna ports in a received transmission). In some cases, some antenna ports may be referred to as quasi co-located, meaning that the properties of a channel (e.g., spatial receive properties) over which a symbol is conveyed on one antenna port may be inferred from the properties of a channel over which another symbol is conveyed on another antenna port. This implicit relationship between antenna ports may improve the chances that a UE is able to successfully decode a downlink transmission. Current techniques for performing receiver processing based on QCL assumptions, in some instances, may be deficient.

SUMMARY

The described techniques relate to improved methods, systems, devices, or apparatuses that support physical downlink shared channel (PDSCH) reception when physical downlink control channel (PDCCH) with different spatial quasi-colocation (QCL) assumptions are mapped to the same control resource set (CORESET). The examples described herein provide a procedure for enabling a user equipment (UE) to decode PDSCH resources based on receiving a CORESET that includes multiple PDCCHs each having a different spatial QCL assumption.

In some wireless communications systems, a base station may generate multiple grants that are associated with different parameters. In some cases, the parameters may indicate spatial QCL assumptions mapped to the same CORESET. The first grant may allocate resources to the UE in a first PDSCH region during a first time slot (i.e., during the time slot when the UE receives the CORESET) and the second grant may allocate resources to the UE in a second PDSCH region during a second time slot. The UE may be configured to monitor different time slots (or transmission time intervals (TTIs)) and identify a CORESET that includes at least two grants each being associated with a different spatial QCL assumption. A spatial QCL assumption may indicate a spatial QCL relationship between a grant and a synchronization signal block (SSB) beam. Knowledge of a QCL assumption may indicate to the UE that a QCL relationship exists between a particular grant, a particular SSB beam, and a PDSCH region of a particular slot.

The UE may use the QCL relationship to infer channel properties (e.g., spatial receive properties) for that PDSCH region from channel properties of that SSB beam. The UE may use the QCL relationship to, for example, configure antenna weights of a receive beam to steer the receive beam in the direction of the SSB beam to enhance reception of resources of a PDSCH region within a slot. The UE may then decode, during at least one of the first time slot and the second time slot, the allocated resources indicated in at least one of the first grant and the second grant. Beneficially, the techniques described herein may enhance PDSCH reception, reduce complexity and latency, and improve performance when processing a control resource set that includes multiple PDCCHs each having different spatial QCL assumptions.

A method of wireless communication at a UE is described. The method may include monitoring, via a receive beam, a first TTI of a set of different TTIs for a control resource set, decoding the control resource set to obtain a first grant and a second grant, determining that the first grant and the second grant are associated with different parameters mapped to the control resource set based on decoding multiple grants from the control resource set, and decoding, during at least one of the first TTI and a second TTI of the set different TTIs, resources of a channel or signal indicated in at least one of the first grant and the second grant.

An apparatus for wireless communication at a UE is described. The apparatus may include a processor, memory in electronic communication with the processor, and instructions stored in the memory. The instructions may be executable by the processor to cause the apparatus to monitoring, via a receive beam, a first TTI of a set of different TTIs for a control resource set, decoding the control resource set to obtain a first grant and a second grant, determining that the first grant and the second grant are associated with different parameters mapped to the control resource set based on decoding multiple grants from the control resource set, and decoding, during at least one of the first TTI and a second TTI of the set different TTIs, resources of a channel or signal indicated in at least one of the first grant and the second grant.

Another apparatus for wireless communication at a UE is described. The apparatus may include monitoring, via a receive beam, a first TTI of a set of different TTIs for a control resource set, decoding the control resource set to obtain a first grant and a second grant, determining that the first grant and the second grant are associated with different parameters mapped to the control resource set based on decoding multiple grants from the control resource set, and decoding, during at least one of the first TTI and a second TTI of the set different TTIs, resources of a channel or signal indicated in at least one of the first grant and the second grant.

A non-transitory computer-readable medium storing code for wireless communication at a UE is described. The code may include instructions executable by a processor to monitoring, via a receive beam, a first TTI of a set of different TTIs for a control resource set, decoding the control resource set to obtain a first grant and a second grant, determining that the first grant and the second grant are associated with different parameters mapped to the control resource set based on decoding multiple grants from the control resource set, and decoding, during at least one of the first TTI and a second TTI of the set different TTIs, resources of a channel or signal indicated in at least one of the first grant and the second grant.

In some examples of the method, apparatuses, and non-transitory computer-readable medium described herein, decoding the resources of the channel or signal further may include operations, features, means, or instructions for monitoring, using the receive beam, first resources of the channel or signal corresponding to the first grant during the first TTI and second resources of the channel or signal corresponding to the second grant during the second TTI.

In some examples of the method, apparatuses, and non-transitory computer-readable medium described herein, decoding the resources of the channel or signal further may include operations, features, means, or instructions for decoding the first resources of the channel or signal corresponding to the first grant and decoding the second resources of the channel or signal corresponding to the second grant.

In some examples of the method, apparatuses, and non-transitory computer-readable medium described herein, a first parameter of the different parameters may be that the first grant may have a spatial QCL relationship with a first SSB beam and/or a first reference signal, and a second parameter of the different parameters may be that the second grant may have a spatial QCL relationship with a second SSB beam and/or a second reference signal that may be different than the first SSB beam and/or the first reference signal.

In some examples of the method, apparatuses, and non-transitory computer-readable medium described herein, decoding the resources of the channel or signal further may include operations, features, means, or instructions for decoding first resources of the channel or signal corresponding to the first grant during the first TTI based on the first parameter and decoding second resources of the channel or signal corresponding to the second grant during the second TTI based on the second parameter.

In some examples of the method, apparatuses, and non-transitory computer-readable medium described herein, decoding the resources of the channel or signal further may include operations, features, means, or instructions for setting at least one beam parameter of a first receive beam based on the first parameter and at least one beam parameter of a second receive beam based on the second parameter, monitoring first resources of the channel or signal during the first TTI using the first receive beam and second resources of the channel or signal during the second TTI using the second receive beam and decoding the first resources of the channel or signal based on the first parameter and the second resources of the channel or signal based on the second parameter.

Some examples of the method, apparatuses, and non-transitory computer-readable medium described herein may further include operations, features, means, or instructions for determining a location of the first grant within the control resource set and a location of the second grant within the control resource set, determining that a first parameter of the different parameters corresponds to the first TTI based on the location of the first grant and determining that a second parameter of the different parameters corresponds to the second TTI based on the location of the second grant.

In some examples of the method, apparatuses, and non-transitory computer-readable medium described herein, decoding the resources of the channel or signal further may include operations, features, means, or instructions for decoding first resources of the channel or signal corresponding to the first grant during the first TTI based on the first parameter and decoding second resources of the channel or signal corresponding to the second grant during the second TTI based on the second parameter.

In some examples of the method, apparatuses, and non-transitory computer-readable medium described herein, the location of the first grant and the location of the second grant respectively correspond to different control channel element (CCE) indexes.

In some examples of the method, apparatuses, and non-transitory computer-readable medium described herein, the location of the first grant and the location of the second grant respectively correspond to different time and frequency resources within the control resource set.

Some examples of the method, apparatuses, and non-transitory computer-readable medium described herein may further include operations, features, means, or instructions for determining that a first parameter of the different parameters corresponds to the first TTI based on the first TTI occurring before the second TTI and determining that a second parameter of the different parameters corresponds to the second TTI based on the second TTI occurring after the first TTI.

Some examples of the method, apparatuses, and non-transitory computer-readable medium described herein may further include operations, features, means, or instructions for determining that a first parameter of the different parameters corresponds to the first TTI based on the first grant allocating first resources of the channel or signal within the first TTI and determining that a second parameter of the different parameters corresponds to the second TTI based on the second grant allocating second resources of the channel or signal within the second TTI.

Some examples of the method, apparatuses, and non-transitory computer-readable medium described herein may further include operations, features, means, or instructions for estimating a first channel parameter for a first demodulation reference signal (DMRS) within the control resource set associated with the first grant and a second channel parameter for a second DMRS within the control resource set associated with the second grant, determining that a first parameter of the different parameters corresponds to the first TTI based on the first channel parameter and the second channel parameter and determining that a second parameter of the different parameters corresponds to the second TTI based on the first channel parameter and the second channel parameter.

In some examples of the method, apparatuses, and non-transitory computer-readable medium described herein, each of the first channel parameter and the second channel parameter may be signal to noise ratio (SNR) estimate, a signal to interference plus noise (SINR) estimate, or both.

Some examples of the method, apparatuses, and non-transitory computer-readable medium described herein may further include operations, features, means, or instructions for determining not to decode the resources of the channel or signal during one of the first TTI or the second TTI based on the first channel parameter or the second channel parameter.

Some examples of the method, apparatuses, and non-transitory computer-readable medium described herein may further include operations, features, means, or instructions for determining to decode first resources of the channel or signal during the first TTI and second resources of the channel or signal during the second TTI based on the first channel parameter or the second channel parameter.

Some examples of the method, apparatuses, and non-transitory computer-readable medium described herein may further include operations, features, means, or instructions for determining which of the first parameter or the second parameter may be associated with the first grant based on the first channel parameter and the second channel parameter.

In some examples of the method, apparatuses, and non-transitory computer-readable medium described herein, decoding the control resource set to obtain the first grant and the second grant further may include operations, features, means, or instructions for decoding the control resource set to obtain the first grant and the second grant in accordance with one of the first parameter or the second parameter.

In some examples of the method, apparatuses, and non-transitory computer-readable medium described herein, a beam index of a first SSB beam corresponds to a first parameter of the different parameters and a beam index of a second SSB beam corresponds to a second parameter of the different parameters.

In some examples of the method, apparatuses, and non-transitory computer-readable medium described herein, a payload may be transported in the channel or signal via a first SSB beam during the first TTI and via a second SSB beam during the second TTI.

In some examples of the method, apparatuses, and non-transitory computer-readable medium described herein, the payload includes a remaining minimum system information (RMSI) payload.

Some examples of the method, apparatuses, and non-transitory computer-readable medium described herein may further include operations, features, means, or instructions for transmitting acknowledgement feedback indicating whether decoding of the payload was successful.

In some examples of the method, apparatuses, and non-transitory computer-readable medium described herein, decoding the control resource set further may include operations, features, means, or instructions for decoding a set of decoding candidates within a common search space corresponding to the control resource set to obtain the first grant and the second grant.

Some examples of the method, apparatuses, and non-transitory computer-readable medium described herein may further include operations, features, means, or instructions for determining that a first parameter of the different parameters corresponds to the first TTI based on the first grant allocating first resources of the channel or signal within the first TTI that may be frequency division multiplexed with a first SSB and determining that a second parameter of the different parameters corresponds to the second TTI based on the second grant allocating second resources of the channel or signal within the second TTI that may be frequency division multiplexed with a first SSB.

A method of wireless communication at a base station is described. The method may include generating a first grant allocating first resources of a channel or signal within a first TTI of a set of different TTIs and a second grant allocating second resources of the channel or signal within a second TTI of the set of different TTIs and transmitting the first grant and the second grant within a control resource set of the first TTI, the first grant being associated with a first parameter and the second grant being associated with a second parameter that is different than the first parameter.

An apparatus for wireless communication at a base station is described. The apparatus may include a processor, memory in electronic communication with the processor, and instructions stored in the memory. The instructions may be executable by the processor to cause the apparatus to generating a first grant allocating first resources of a channel or signal within a first TTI of a set of different TTIs and a second grant allocating second resources of the channel or signal within a second TTI of the set of different TTIs and transmitting the first grant and the second grant within a control resource set of the first TTI, the first grant being associated with a first parameter and the second grant being associated with a second parameter that is different than the first parameter.

Another apparatus for wireless communication at a base station is described. The apparatus may include generating a first grant allocating first resources of a channel or signal within a first TTI of a set of different TTIs and a second grant allocating second resources of the channel or signal within a second TTI of the set of different TTIs and transmitting the first grant and the second grant within a control resource set of the first TTI, the first grant being associated with a first parameter and the second grant being associated with a second parameter that is different than the first parameter.

A non-transitory computer-readable medium storing code for wireless communication at a base station is described. The code may include instructions executable by a processor to generating a first grant allocating first resources of a channel or signal within a first TTI of a set of different TTIs and a second grant allocating second resources of the channel or signal within a second TTI of the set of different TTIs and transmitting the first grant and the second grant within a control resource set of the first TTI, the first grant being associated with a first parameter and the second grant being associated with a second parameter that is different than the first parameter.

Some examples of the method, apparatuses, and non-transitory computer-readable medium described herein may further include operations, features, means, or instructions for transmitting a payload in the first resources of the first TTI using a first SSB beam and in the second resources of the second TTI using a second SSB beam.

In some examples of the method, apparatuses, and non-transitory computer-readable medium described herein, the first parameter may be that the first grant may have a spatial QCL relationship with a first SSB beam and/or a first reference signal, and the second parameter may be that the second grant may have a spatial QCL relationship with a second SSB beam and/or a second reference signal that may be different than the first SSB beam and/or the first reference signal.

In some examples of the method, apparatuses, and non-transitory computer-readable medium described herein, generating the first grant and the second grant further may include operations, features, means, or instructions for determining that the first grant and the second grant may be associated with different parameters mapped to the control resource set and generating the first grant and the second grant to schedule transmission of a payload in multiple different TTIs of the set of different TTIs.

In some examples of the method, apparatuses, and non-transitory computer-readable medium described herein, transmitting the first grant and the second grant further may include operations, features, means, or instructions for transmitting the first grant at a first location within the control resource set to indicate that the first grant may be associated within the first parameter and transmitting the second grant at a second location within the control resource set to indicate that the second grant may be associated within the second parameter.

In some examples of the method, apparatuses, and non-transitory computer-readable medium described herein, the first location corresponds to a first CCE index and the second location corresponds to a second CCE index.

In some examples of the method, apparatuses, and non-transitory computer-readable medium described herein, the first location and the second location respectively correspond to different time and frequency resources within the control resource set.

In some examples of the method, apparatuses, and non-transitory computer-readable medium described herein, generating the first grant and the second grant further may include operations, features, means, or instructions for generating the first grant to allocate the first resources within the first TTI to indicate that the first grant may be associated within the first parameter and generating the second grant to allocate the second resources within the second TTI to indicate that the second grant may be associated within the second parameter.

Some examples of the method, apparatuses, and non-transitory computer-readable medium described herein may further include operations, features, means, or instructions for generating a transmission that frequency division multiplexes a first SSB with the first resources of the channel or signal within the first TTI to indicate that the first grant may be associated within the first parameter and frequency division multiplexes a second SSB with the second resources of the channel or signal within the second TTI to indicate that the second grant may be associated within the second parameter and transmitting the transmission.

DETAILED DESCRIPTION

Figure 1:
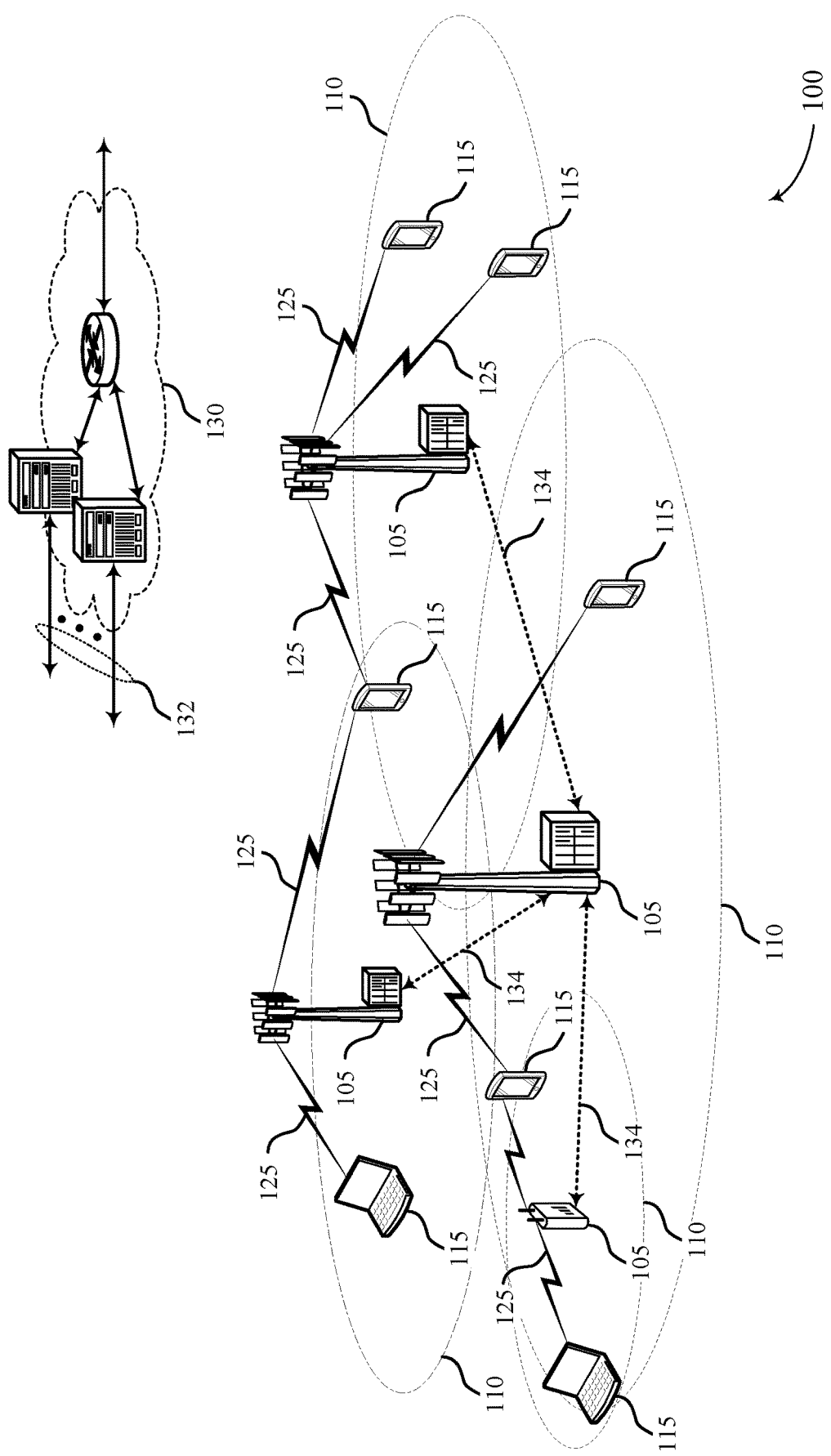
FIG. 1 illustrates an example of a wireless communications system that supports physical downlink shared channel (PDSCH) reception when physical downlink control channel (PDCCH) with different spatial quasi-colocation (QCL) assumptions are mapped to the same control resource set (CORESET) in accordance with aspects of the present disclosure.

The examples described herein provide a procedure for enabling a user equipment (UE) to decode a channel or signal based on receiving a control resource set (CORESET) that includes multiple grants each having a different spatial quasi-colocation (QCL) assumption. In some cases, the channel or signal may include a shared data channel. In some wireless communications systems, a base station may generate multiple grants for a UE that are transmitted within a same CORESET, and the base station may not signal, or otherwise indicate, which QCL assumption corresponds to which grant in the CORESET. The techniques described herein may enable the UE to determine and/or infer which QCL assumption corresponds which grant in the CORESET.

In some wireless communications systems, a base station may communicate with a UE using multiple antennas. For example, a base station may transmit parallel data streams over respective antennas in order to increase throughput (e.g., as opposed to transmitting the data streams sequentially over the same antenna). Additionally, or alternatively, a base station may transmit a given data stream over multiple antennas simultaneously (e.g., to increase the diversity of the transmissions). In some cases, the use of multiple antennas may be based on the use of one or more antenna ports. An antenna port is a logical entity used to map data streams to antennas. A given antenna port may drive transmissions from one or more antennas (e.g., and resolve signal components received over one or more antennas). Each antenna port may be associated with a reference signal (e.g., which may allow a receiver to distinguish data streams associated with the different antenna ports in a received transmission).

Some antenna ports may be referred to as quasi co-located, meaning that the properties of a channel (e.g., spatial receive properties) over which a symbol is conveyed on one antenna port may be inferred from the properties of a channel over which another symbol is conveyed on another antenna port. Accordingly, a receiving device (e.g., a UE) may be able to perform receiver processing for demodulating data or control information received on a first set of antenna ports based on reference signals received on a second set of antenna ports that are quasi co-located with the first set of antenna ports. Thus, a spatial QCL relationship between antenna ports (also referred to as a QCL assumption when the spatial QCL relationship is assumed) may improve the chances that a UE may be able to successfully decode a downlink transmission from a base station. In some cases, a parameter may indicate a spatial QCL relationship between a particular grant and a particular synchronization signal block (SSB) beam. A SSB beam may transport a SSB that includes a primary synchronization signal (PSS), a second synchronization signal (SSS), and a physical broadcast channel (PBCH). The UE may use the SSB for synchronizing with and decoding of transmission from the base station. In some cases, the parameter may include a transmission/reception point (TRP) identifier (TRP ID), and the UE may receive grants associated with different TRP IDs.

In an example, a base station may transmit different grants having different QCL assumptions within the same CORESET. The base station, however, may not indicate which QCL assumption corresponds to each grant in the CORESET. The UE may be configured to monitor different time slots (or transmission time intervals (TTIs)) to receive and decode a CORESET communicated within a first time slot. The UE may decode the CORESET to obtain a first grant and a second grant. In some cases, the base station may generate the first grant to allocate resources to the UE in a first PDSCH region during a first time slot (i.e., during the time slot when the UE receives the CORESET) and may generate the second grant to allocate resources to the UE in a second PDSCH region during a second time slot.

In some cases, a payload transported in the first and second PDSCH regions may be the same, and the UE may be configured to decode, during at least one of the first time slot and the second time slot, the allocated resources indicated in at least one of the first grant and the second grant to obtain the payload. The payload may be, for example, a remaining minimum system information (RMSI) payload that communicates control information from the base station to the UE.

Over time, the base station may sweep through a set of SSB beams where up to each beam is directed in a different direction, and the base station may transmit a SSB on each beam. In some cases, the base station may transmit a SSB on a different beam that changes per slot. The UE may use information derived from a SSB for decoding a PDSCH region that has a QCL relationship with the SSB. In some examples, the UE may configure one or more beam parameters, such as its antenna weights for a receive beam, on a slot by slot basis in accordance with the QCL assumption determined for each grant to enhance PDSCH reception. Knowledge of a QCL assumption may inform the UE that a QCL relationship exists between a particular grant, a particular SSB beam, and a PDSCH region of a particular slot, and hence channel properties (e.g., spatial receive properties) for that PDSCH region may be inferred from channel properties of that SSB beam. The UE may use the QCL relationship to, for example, configure antenna weights of a receive beam to steer the receive beam in the direction of the SSB beam to enhance reception of a SSB transmitted by the base station on that SSB beam.

In an example, the UE may configure its antenna weights for a receive beam on a slot by slot basis. The UE may determine that the first grant corresponds to a first QCL assumption and a second grant corresponds to a second QCL assumption. The UE may configure its antenna weights for a first receive beam in accordance with the first QCL assumption to enhance reception of allocated resources within a first PDSCH region during a first time slot beam. The UE may then modify its antenna weights for a second receive beam in accordance with the second QCL assumption during a second slot to receive allocated resources within a second PDSCH region.

Aspects of the disclosure introduced above are described below in the context of a wireless communications system. Examples of processes and signaling exchanges that support PDSCH reception when PDCCH with different parameters are mapped to the same CORESET are then described. Aspects of the disclosure are further illustrated by and described with reference to apparatus diagrams, system diagrams, and flowcharts that relate to PDSCH reception when PDCCH with different parameters are mapped to the same CORESET.

FIG. 1 illustrates an example of a wireless communications system 100 that supports PDSCH reception when PDCCH with different spatial QCL assumptions are mapped to the same CORESET in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200$ $T_s$. The radio frames may be identified by a system frame number (SFN) ranging from 0 to 1023. Each frame may include 10 subframes numbered from 0 to 9, and each subframe may have a duration of 1 ms. A subframe may be divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, a base station may transmit data streams mapped to one or more antennas using antenna port. According to existing techniques, a receiver may be configured to distinguish data streams associated with different antenna ports in a received transmission. To enhance PDSCH reception, reduce complexity and latency, and improve performance when processing a control resource set that includes multiple PDCCHs each having different spatial QCL assumptions, according to one or more aspects of the present disclosure, the UE 115 may use the QCL relationship to infer channel properties (e.g., spatial receive properties) for a PDSCH region from channel properties of a SSB beam.

According to one or more aspects of the present disclosure, the UE 115 may monitor, via a receive beam, a first time slot of a plurality of different time slots for the CORESET. The UE may then decode the CORESET to obtain a first grant and a second grant, and determine that the first grant and the second grant are associated with different parameters In some cases, the parameters may include TRP IDs, and the UE may receive the first grant and the second grant associated with different TRP IDs. In some cases, the parameters may indicate spatial QCL assumptions mapped to the CORESET. The UE 115 may decode, during at least one of the first time slot and a second time slot of the plurality different time slots, resources of a channel or signal indicated in at least one of the first grant and the second grant. The examples described herein provide a procedure for enabling the UE 115 to decode a channel or signal, such as a PDSCH, based on receiving a CORESET that includes multiple grants that each have different parameters.

According to one or more aspects of the present disclosure, the base station 105 may generate a first grant allocating first resources of a channel or signal (e.g., PDSCH) within a first time slot (such as a TTI) and a second grant allocating second resources of the channel or signal within a second time slot. In some cases, the first time slot and the second time slot may be included in a set of at least two time slots. The base station 105 may transmit the first grant and the second grant within a CORESET of the first time slot. In some cases, the first grant may be associated with a first spatial QCL assumption and the second grant may be associated with a second spatial QCL assumption that is different than the first spatial QCL assumption.

Figure 2:
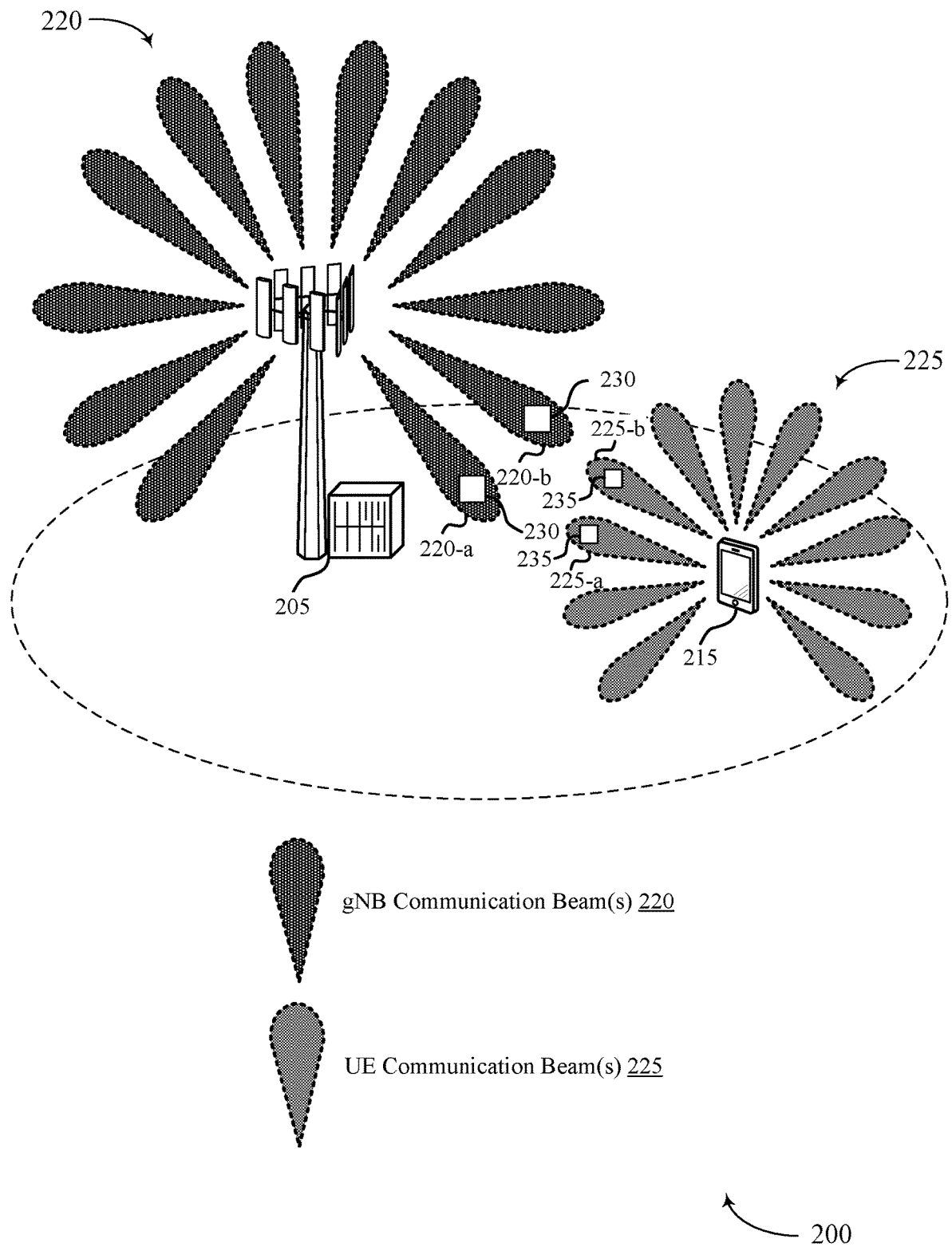
FIG. 2 illustrates an example of a wireless communications system that supports PDSCH reception when PDCCH with different spatial QCL assumptions are mapped to the same CORESET in accordance with aspects of the present disclosure.

FIG. 2 illustrates an example of a wireless communications system 200 that supports PDSCH reception when PDCCH with different spatial QCL assumptions are mapped to the same CORESET in accordance with aspects of the present disclosure. In some examples, the wireless communications system 200 may implement aspects of wireless communications system 100. The wireless communications system 200 may include a base station 205 and a UE 215, which may be examples of the corresponding devices described with reference to FIG. 1. The wireless communications system 200 may support efficiently handling PDSCH reception when PDCCH with different spatial QCL assumptions are mapped to the same CORESET.

The base station 205 may perform a radio resource control (RRC) procedure (e.g., cell acquisition procedure, random access procedure, RRC connection procedure, RRC configuration procedure) with the UE 215. The base station 205 may be configured with multiple antennas, which may be used for directional or beamformed transmissions (e.g., beamformed communication beams 220). Similarly, the UE 215 may be configured with multiple antennas, which may be used for directional or beamformed transmissions (e.g., beamformed communication beams 225). In some examples, the RRC procedure may include a beam sweep procedure. As illustrated, the base station 205 and/or the UE 215 may transmit a number of beamformed communication beams 220, 225 in different directions within a coverage area.

As part of the RRC procedure, the base station 205 and the UE 215 may synchronize before the base station 205 schedules and allocates resources (e.g., time and frequency resources) for the UE 215. In some cases, the base station 205 and the UE 215 may repeat the beam sweep pattern over different communication beams 220, 225 in an order which may be determined according to a given beam sweep pattern. The base station 205 and the UE 215 may have at least one active communication beam that is being used for wireless communications, as a result of the RRC procedure. The base station 205 may communicate with the UE 215 on an active communication beam 220-*a*, and the UE 215 may communicate with the base station 205 on an active communication beam 225-*a*. The active communication beam may be used for transmitting transmissions 230, 235 such as data and control information. The active communication beam may be a downlink receive beam and an uplink transmit beam for the UE 215, or a downlink transmit beam and an uplink receive beam for the base station 205. In some aspects, an active communication beam may change, for example, due to mobility, interference, blockage, and the like. In the case that the base station 205 identifies a change to an active communication beam, such as a blockage, the base station 205 may transmit a beam switch signal, additionally or alternatively referred to as a beam switch command, to the UE 215.

In a downlink scenario, multiple grants associated with different QCL assumptions may be mapped to a CORESET. The base station 205 may generate a first grant allocating first resources of a channel or signal within a first time slot and a second grant allocating second resources of the channel or signal within a second time slot. In some cases, the channel or signal may include a shared data channel. The base station 205 may indicate the first resources using a first grant and the second resources using a second grant. In some cases, the first grant may be associated with a first SSB beam and the second grant may be associated with a second SSB beam. In some examples, the first grant may be associated with a first reference signal and the second grant may be associated with a second reference signal. Additionally or alternatively, the first grant may be associated with a combination of the first SSB and the first reference signal and the second grant may be associated with a combination of the second SSB and the second reference signal. In some cases, the second reference signal may be different from the first reference signal. The first and second reference signals may include tracking reference signal (TRS), channel state information reference signal (CSI-RS), etc. In some cases, the base station 205 may transmit the first grant and the second grant within a CORESET of the first time slot. The base station 205 may be configured to include the first resources in the first time slot and the second resources in the second time slot. In some cases, the UE 215 may monitor via a receive beam, the first time slot to receive a CORESET. Upon receiving the CORESET, the UE may decode the CORESET to determine the first grant and the second grant. The UE may then determine that the first grant and the second grant are associated with different spatial QCL assumptions mapped to the CORESET. The UE 215 may then decode the first resources during the first time slot and the second resources during the second time slot.

Figure 3:
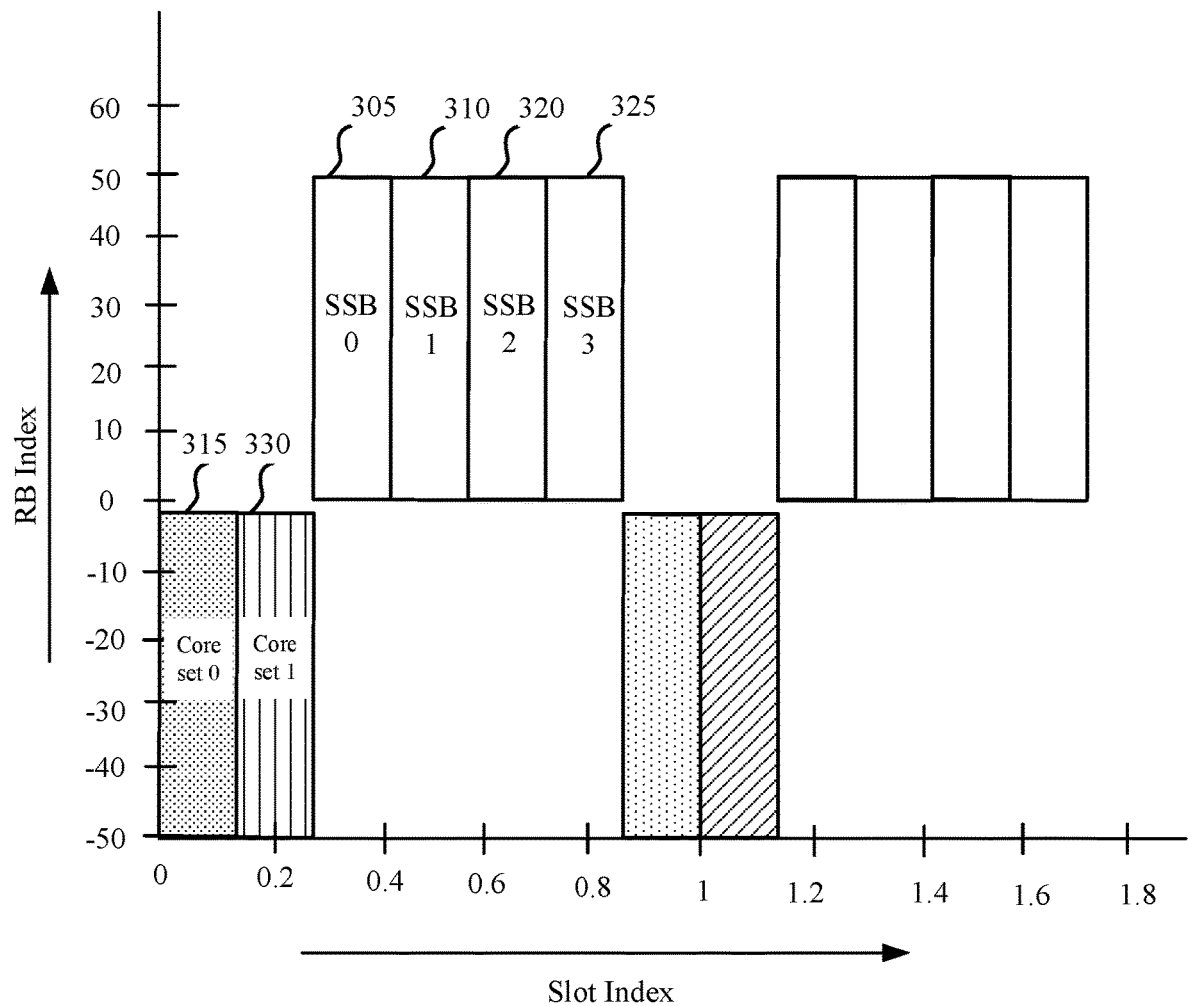
FIG. 3 illustrates an example communication between a base station and a UE that supports PDSCH reception when PDCCH with different spatial QCL assumptions are mapped to the same CORESET in accordance with aspects of the present disclosure.

FIG. 3 illustrates an example communication 300 between a base station 205 and a UE 215, that supports PDSCH reception when PDCCH with different spatial QCL assumptions are mapped to the same CORESET in accordance with aspects of the present disclosure. The base station 205 and the UE 215 may be examples of the devices described herein. FIG. 3 depicts slot indexes along the x-axis and resource block (RB) indexes along the y-axis. In some cases, two SSB indexes may be mapped to the same CORESET. In the example of FIG. 3, the index associated with SSB 0 305 and the index associated with SSB 1 310 may be mapped to the CORESET 315. Similarly, the index associated with SSB 2 320 and the index associated with SSB 3 325 may be mapped to the CORESET 330. In some cases, multiple SSBs may be mapped to a same RMSI CORESET (e.g., multiplexing pattern 1).

In some NR systems, the SSB indexes may be of a 240 KHz numerology and a control information may be of 120 KHz numerology. In at least such cases as well as in other instances, two or more SSB indexes may be mapped to the same CORESET. As a result, if the base station transmits multiple SSBs, the base station may additionally or alternatively transmit a grant corresponding to each SSB that is mapped to the same CORESET, For example, when SSB 0 305 and SSB 1 310 are mapped to the CORESET 315, the base station 205 may include a first PDCCH having a first grant associated with the SSB 0 305 and a second PDCCH having a grant associated with the SSB 1 in the CORESET 315. In some cases, each grant included in the CORESET may be configured to schedule different resources (such as resources included in PDSCH) for the UE in different time slots. For example, the first grant may be configured to identify resources in a first PDSCH region of a first slot and the second grant may be configured to identify resources in a second PDSCH region of a second slot. Because the first grant and the second grant are associated with different SSB indexes, the first grant and the second grant have different spatial QCL assumptions. The techniques described herein provide for the UE to efficiently decode the received resources in a manner that decreases decoding complexity and decoding latency, and increases performance.

Figure 4:
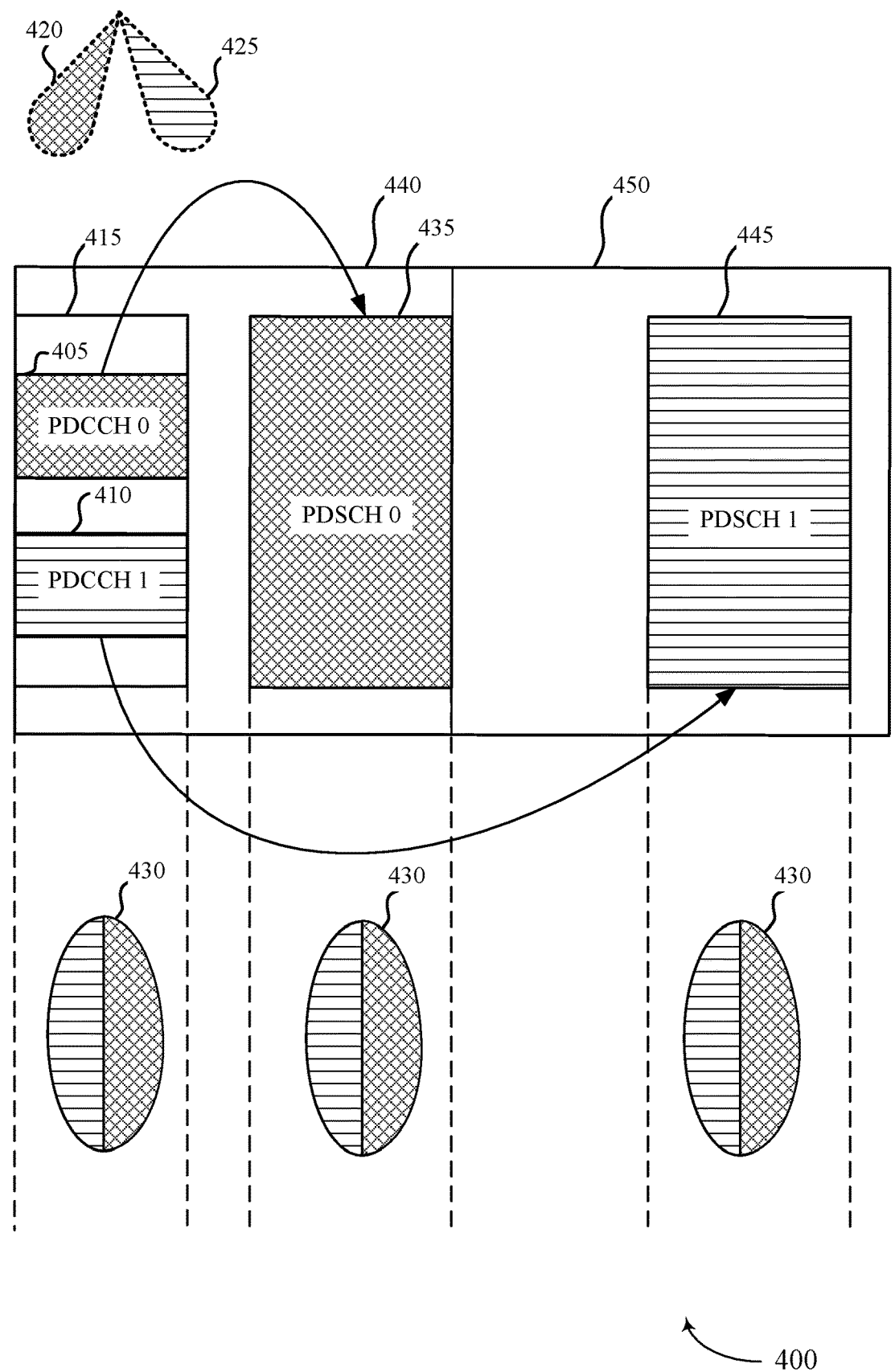
FIG. 4 illustrates an example scheduling technique that supports PDSCH reception when PDCCH with different spatial QCL assumptions are mapped to the same CORESET in accordance with aspects of the present disclosure.

FIG. 4 illustrates an example of a scheduling technique 400 that supports PDSCH reception when PDCCH with different spatial QCL assumptions are mapped to the same CORESET in accordance with aspects of the present disclosure. The technique of FIG. 4 may be performed by base station 205 and UE 215. The base station 205 and the UE 215 may be examples of the devices described herein. In FIG. 4, frequency is represented vertically, and time is represented horizontally. Each of time slots 440 and 450 may correspond to time and frequency resources. Each time slot may, for example, span one or more RBs in frequency, and span 14 symbol periods (e.g., OFDM symbol periods) in time.

In an example, a UE 215 may receive and decode, from CORESET 415, a first grant 405 in PDCCH 0 and a second grant 410 in PDCCH 1. The CORESET 415 may, for example, span two symbol periods and one or more RBs within the first time slot 440. The first grant 405 may be associated with a first SSB beam 420 and the second grant 410 may be associated with a second SSB beam 425. In some examples, the first grant 405 may be associated with a first reference signal (not shown) and the second grant 410 may be associated with a second reference signal (not shown). In some cases, the first grant 405 may be associated with a combination of the first SSB beam 420 and the first reference signal and the second grant 410 may be associated with a combination of the second SSB beam 425 and the second reference signal. The association of the first and second grants with the SSB beams and the reference signals may allow the UE 215 to perform the decoding operations in initial-access mode as well as in connected mode.

In some cases, the first grant 405 may be associated with a first parameter (e.g., correspond to SSB 0) and the second grant 410 may be associated with the second parameter (e.g., correspond to SSB 1). The first parameter (such as a first QCL assumption) indicates that the first grant 405 has a spatial QCL relationship with the first SSB beam 420, and the second parameter (such as a second QCL assumption) indicates that the second grant 410 has a spatial QCL relationship with the second SSB beam 425. Since the second SSB beam 425 is different than the first SSB beam, the first grant 405 may have a different parameter from the second grant 410.

In the example of FIG. 4, the UE 215 may scan for one or more SSB beams. Upon identifying a SSB beam, the UE 215 may determine properties of a channel (e.g., spatial receive properties) based on the receive beam, and may infer from the channel properties of another symbol is conveyed on another antenna port. For example, a parameter may be that a particular grant, SSB beam, and PDSCH region have a QCL relationship, and the UE 215 may infer channel properties for that PDSCH region based on channel properties determined from that SSB beam. The UE 115 may use the inferred channel properties to enhance reception of a transmission within the PDSCH region, including determining a channel estimate for demodulating and decoding the PDSCH region, and for setting antenna weights of a receive beam to enhance reception of the SSB beam. Because of the QCL relationship, enhancing reception of the SSB enhances reception of a transmission within the PDSCH region.

In an example, UE 215 may determine antenna weights of a set of receive beams where a respective receive beam is configured to enhance reception of a particular SSB beam. In some cases, a UE 215 may identify a first receive beam based on a QCL relationship with the first SSB beam 420, and a second receive beam based on a QCL relationship the second SSB beam 425. In some examples, an angular spread between the first SSB beam 420 and the second SSB beam 425 may not be higher than a threshold, and the UE 215 may be able to observe both the first SSB beam 420 and the second SSB beam 425 using a single receive beam that is not configured to enhance reception of either SSB beam 420 or SSB beam 425, or may be steered to enhance reception of one of SSB beam 420 or SSB beam 425, but not the other.

In the example of FIG. 4, the UE 215 may use a composite receive beam 430-a to receive and decode the CORESET 415. The UE 215 may use the composite receive beam 430-a to receive the first grant 405 and the second grant 410, but the composite receive beam 430-a may or might not be configured to enhance reception of either the SSB beam 420 or SSB beam 425. In some cases, the composite receive beam 430-a may not be enhanced to receive either the first SSB beam 420 or the second SSB beam 425.

In some cases, the UE 215 may use the composite receive beam 430-a to receive multiple grants from the same CORESET where two or more grants pass error detection. In some cases, the UE 215 may decode a plurality of decoding candidates within a common search space corresponding to the CORESET 415 and determine that multiple decoding candidates pass error detection (e.g., multiple decoding candidates pass CRC). Each decoding candidate within a search space may correspond to particular time and frequency resources within the CORESET 415, and may or may not overlap with other decoding candidates. The UE 215 may decode the decoding candidates and determine that each of a first grant 405 and a second grant 410 passes error detection. Because a single CORESET 415 includes multiple grants, the UE 215 may determine that the first grant 405 and the second grant 410 are each associated with different QCL assumptions.

As described in the example of FIG. 4, the base station 205 may apply a time-first mapping when including the first grant 405 and the second grant 410 within the CORESET 415. A time-first mapping may correspond to the order in which the CORESET 415 is decoded. The UE 215 may begin decoding symbols at a highest frequency and earliest time with the resources of the CORESET 415, and decode all symbols at the highest frequency from the earliest to latest resources allocated within the CORESET 415. The UE 215 may then move to the next highest frequency with the CORESET 415 and decode all symbols at from the earliest to latest resources within the CORESET 415. This process may repeat until all symbols within the within the CORESET 415 have been considered.

As an example, the first grant 405 and the second grant 410 may each span across 2 OFDM symbols. The UE 215 may perform a CRC on a set of decoding candidates to decode the CORESET 415 and identify that the first grant 405 and the second grant 410 pass error detection. Upon decoding the first grant 405, the UE 215 may determine that the first grant 405 includes information for resources allocated in a first PDSCH region 435 within the first time slot 440. Further, the UE 215 may determine that the second grant 410 includes information for resources allocated in a second PDSCH region 445 within the second time slot 450. In some cases, the UE 215 may use the composite receive beam 430 to monitor and receive a signal within resources of the first PDSCH region 435 during the first time slot 440. The UE 215 may further use the composite receive beam 430 to monitor and receive a signal within resources of the second PDSCH region 445 during the second time slot 450. The UE 215 may decode the signal corresponding to the first PDSCH region 435 and the signal corresponding to the second PDSCH region 445.

Since multiple grants are mapped to the same CORESET 415, the UE 215 has an opportunity to decode a same transmission occurring in the PDSCH of multiple, consecutive slots, thereby improving robustness for the transmission. For example, the UE 215 may be configured to decode the first PDSCH 435 during the first time interval 440 (such as a first slot) and the second PDSCH 445 during the second time interval 450 (such as a second slot), to determine whether a payload received within the first PDSCH 435 and/or the second PDSCH 445 passes error detection. The UE 215 may transmit an acknowledgement feedback indicating whether decoding of the payload was successful.

Figure 5:
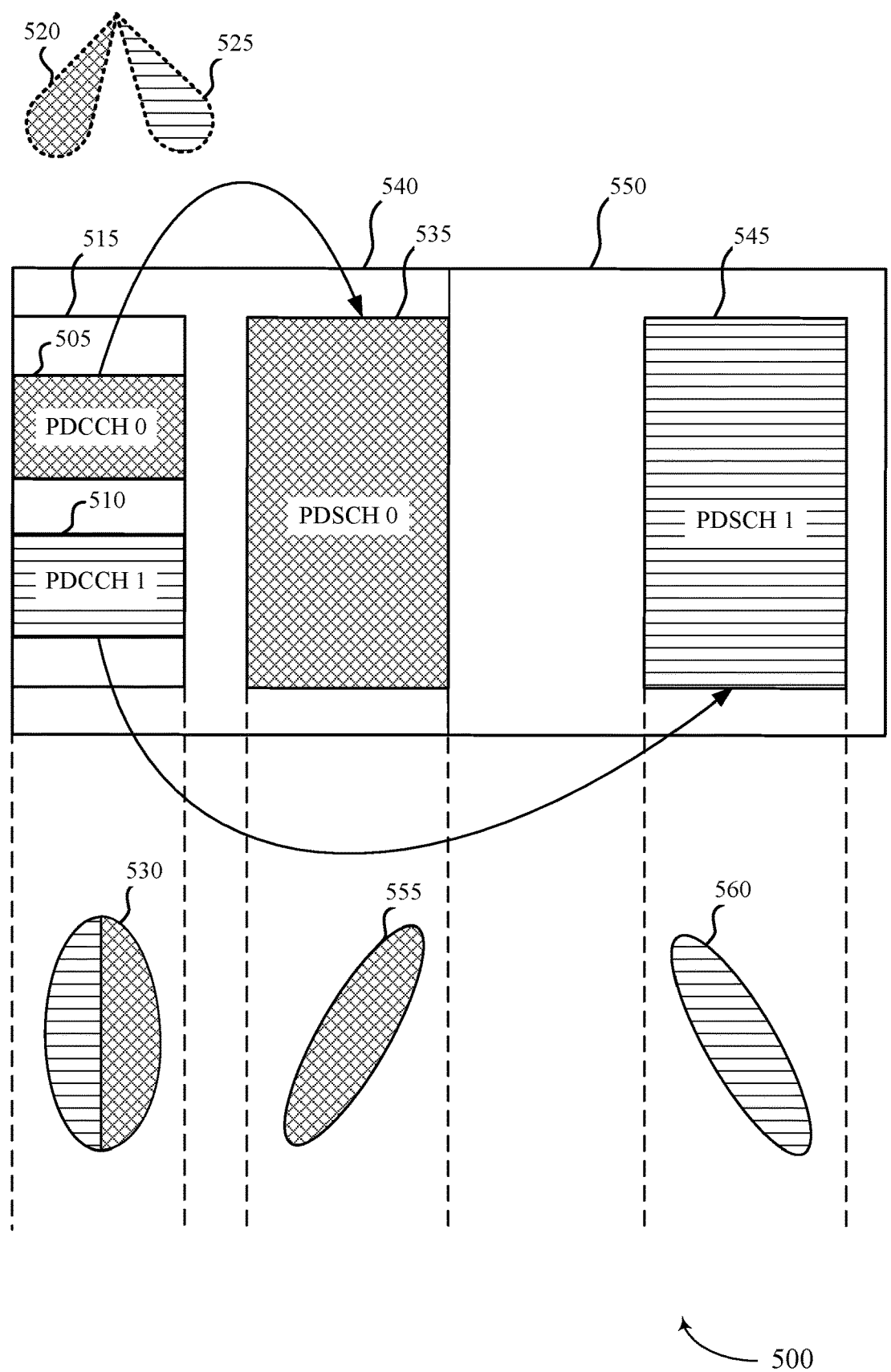
FIG. 5 illustrates an example scheduling technique that supports PDSCH reception when PDCCH with different spatial QCL assumptions are mapped to the same CORESET in accordance with aspects of the present disclosure.

FIG. 5 illustrates an example of a scheduling technique 500 that supports PDSCH reception when PDCCH with different spatial QCL assumptions are mapped to the same CORESET in accordance with aspects of the present disclosure. The operations of FIG. 5 may be performed by base station 205 and UE 215. The base station 205 and the UE 215 may be examples of the devices described herein. In some cases, a UE 215 may receive a first grant 505 and a second grant 510 in a CORESET 515. The first grant 505 may be associated with a first SSB beam 520 and the second grant 510 may be associated with a second SSB beam 525. In some cases, the first grant 505 may be associated with a first parameter and the second grant 510 may be associated with the second parameter. The first parameter may indicate that the first grant 505 has a spatial QCL relationship with the first SSB beam 520, and the second parameter may indicate that the second grant 510 has a spatial QCL relationship with the second SSB beam 525. Since the second SSB beam 525 is different than the first SSB beam. 520, the first grant 505 may have a different parameter from the second grant 510.

In the example of FIG. 5, the UE 215 may use a composite receive beam 530 to decode the CORESET 515, similar to the composite receive beam 430. The UE 215 may use the composite receive beam 530 to receive the first grant 505 and the second grant 510, and the UE 215 may successfully decode each of the first grant 505 and the second grant 510. In some cases, the UE 215 may determine that the first grant 505 and the second grant 510 are each associated with different QCL assumptions due to receiving multiple, different grants in the same CORESET 515.

Upon successfully decoding the first grant 505 and the second grant 510, the UE 215 may determine that the first grant 505 allocates resources in a first PDSCH region 535 within the first time slot 540, and the second grant 510 allocates resources in a second PDSCH region 545 within the second time slot 550. In the example of FIG. 5, the UE 215 may determine a location of the first grant 505 within the CORESET 515 and a location of the second grant 510 within the CORESET 515. As previously discussed, the different parameters may indicate different spatial QCL assumptions. The UE 215 may then determine that a first spatial QCL assumption corresponds to the first time slot 540 based on the location of the first grant 505. Similarly, the UE 215 may determine that a second spatial QCL assumption corresponds to the second time slot 550 based on the location of the second grant 510. For example, the UE 215 may apply time-first decoding, and have a rule indicating that the earliest decoded grant corresponds to a lower SSB beam index and a later decoded grant to schedule resources within a PDSCH region corresponds to a higher SSB beam index. The UE 215 may thus determine that the earliest decoded grant has a QCL relationship with a SSB beam corresponding to the lower SSB beam index, and the later decoded grant has a QCL relationship with a SSB beam corresponding to the higher SSB beam index.

In some cases, the location of the first grant 505 and the location of the second grant 510 may respectively correspond to different control channel element (CCE) indexes. For example, a lower CCE index may correspond to a lower beam index and a higher CCE index may correspond to a higher beam index. For example, the UE 215 may apply time-first decoding, and have a rule indicating that a grant corresponding to a lower CCE index is mapped to a lower SSB beam index, and that a grant corresponding to a higher CCE index is mapped to a higher SSB index. The UE 215 may thus determine that the grant corresponding to the lower CCE index has a QCL relationship with a SSB beam having the lower SSB beam index, and the grant corresponding to the higher CCE index has a QCL relationship with a SSB beam having the higher SSB beam index.

In some instances, the location of the first grant 505 and the location of the second grant 510 may each correspond to different time and frequency resources within the CORESET 515. For example, the UE 215 may apply time-first decoding, and have a rule indicating that a grant decoded from earlier time and frequency resources corresponds to a lower SSB beam index, and that a grant decoded from later time and frequency resources corresponds to a higher SSB index. The UE 215 may thus determine that the grant decoded from earlier time and frequency resources has a QCL relationship with a SSB beam having the lower SSB beam index, and the grant decoded from later time and frequency resources has a QCL relationship with a SSB beam having the higher SSB beam index.

In some instances, the temporal order of slots 540, 550 in which grants 505 and grant 510 allocate resources may be used to infer the QCL assumption. For example, the grant 505 may allocate resources of PDSCH 535 and grant 510 may allocate resources of PDSCH 545. The UE 215 may thus determine that the grant allocating resources in an earlier slot (e.g., slot 540) has a QCL relationship with a SSB beam having the lower SSB beam index, and the grant allocating resources in a later slot (e.g., slot 550) has a QCL relationship with a SSB beam having the higher SSB beam index.

In some instances, even and odd resources may be mapped to SSB indexes for determining a QCL assumption. For example, even CCEs, or even PDSCH frequencies, or even PDSCH time locations, or any combination thereof, may be mapped to an index of a first SSB beam. Similarly, odd CCEs, or odd PDSCH frequencies, or odd PDSCH time locations, or any combination thereof, may be mapped to an index of a second SSB beam. The UE 215 may thus determine that the even resources have a QCL relationship with a SSB beam having the lower SSB beam index, and the odd resources have a QCL relationship with a SSB beam having the higher SSB beam index.

In some examples, the UE 215 may infer a QCL relationship based on how a SSB is frequency division multiplexed with a PDSCH. In some examples, a SSB may be transported in one or more RBs sharing time resources with one or more RBs that transport a PDSCH, but in different frequency resources. The UE 215 may infer a QCL relationship between a SSB beam, a grant, and a PDSCH of a slot based on a SSB being frequency division multiplexed with PDSCH resources allocated by the grant (e.g., within the same or overlapping time resources, but in different RBs). For example, the base station 205 may generate a transmission that frequency division multiplexes a first SSB (e.g., SSB 0 305 that spans RBs 0 to 50 during slot index 0.3 to 0.4) with PDSCH 535 allocated by grant 505 (e.g., spanning RBs −50 to −1 during slot index 0.3 to 0.4), to indicate a QCL relationship between a first SSB beam used to transmit SSB 0 305 and the PDSCH 535. Similarly, the base station 205 may generate a transmission that frequency division multiplexes a second SSB (e.g., SSB 310 that spans RBs 0 to 50 during slot index 0.4 to 0.55) with PDSCH 545 allocated by grant 505 (e.g., spanning RBs −50 to −1 during slot index 0.4 to 0.55), to indicate a QCL relationship between a second SSB beam used to transmit SSB 310 and the PDSCH 545.

Upon identifying a first QCL assumption that the first SSB beam 520 has a QCL relationship with the resources included in the first PDSCH 535, the UE 215 may configure one or more beam parameters, such as antenna weights of first receive beam 555, to enhance reception of a transmission beam used to transmit within the resources of the first PDSCH 535. The UE 215 may identify a second QCL assumption that the second SSB beam 525 has a QCL relationship with the resources included in the second PDSCH 545, and may adjust antenna weights to steer a second receive beam 560 in a different direction to enhance reception of a transmission beam used to transmit within resources of the second PDSCH 545. The UE 215 may be configured to decode the first PDSCH 535 during the first time interval 540 (such as a first slot) in accordance with the first QCL assumption, and may be configured to decode the second PDSCH 545 during the second time interval 550 (such as a second slot) in accordance with the second QCL assumption.

In some cases, each of the first PDSCH 535 and the second PDSCH 545 may transport a same payload, and the UE 215 may determine whether it can successfully decode the payload from either the first PDSCH 535 and the second PDSCH 545. The UE 215 may transmit an acknowledgement feedback indicating whether decoding of the payload from either the first PDSCH 535 and the second PDSCH 545 was successful.

Figure 6:
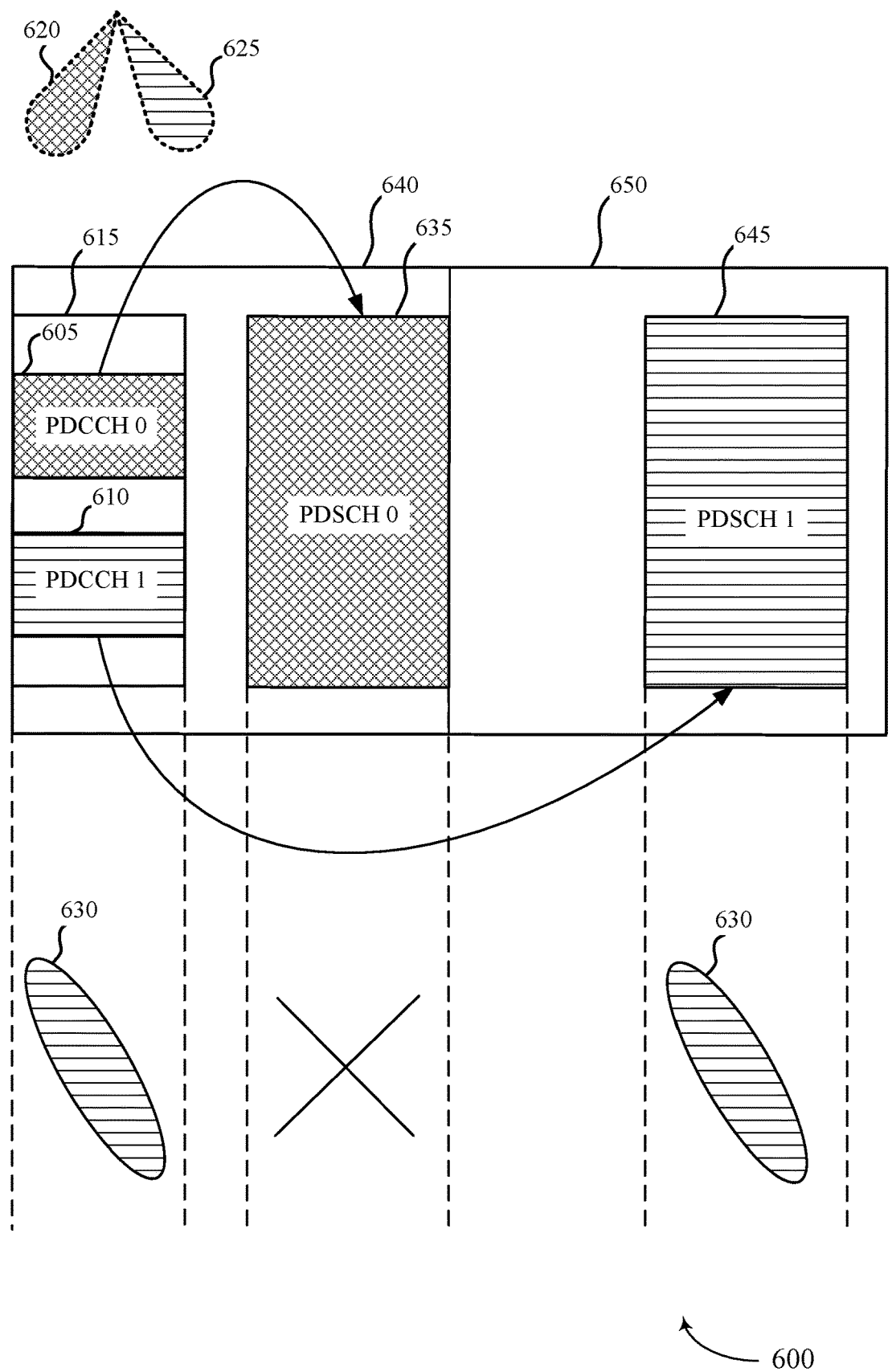
FIG. 6 illustrates an example scheduling technique that supports PDSCH reception when PDCCH with different spatial QCL assumptions are mapped to the same CORESET in accordance with aspects of the present disclosure.

FIG. 6 illustrates an example of a scheduling technique 600 that supports PDSCH reception when PDCCH with different spatial QCL assumptions are mapped to the same CORESET in accordance with aspects of the present disclosure. The technique of FIG. 6 may be performed by base station 205 and UE 215. The base station 205 and the UE 215 may be examples of the devices described herein. In some cases, a UE 215 may receive a first grant 605 and a second grant 610 in a CORESET 615. A first spatial QCL assumption may be that the first grant 605 has a spatial QCL relationship with the first SSB beam 620, and a second spatial QCL assumption may be that the second grant 610 has a spatial QCL relationship with the second SSB beam 625. Since the second SSB beam 625 is different than the first SSB beam. 620, the first grant 605 may have a different spatial QCL assumption from the second grant 610.

In some examples, the UE 215 may steer the receive beam 630 in a direction which enhances reception of one of the SSB beams (e.g. SSB 0), and not the other, in accordance with one of the spatial QCL assumptions to receive the CORESET 615. When the receive beam is steered in the direction of one of the SSB beams (e.g., SSB 0), then a measurement of a channel parameter for a PDCCH demodulation reference signal (DMRS) associated with a grant having a QCL relationship with that SSB beam (e.g., SSB 0) is expected to better than a measurement of a channel parameter for the PDCCH DMRS for other grants. The measured channel parameter may be, for example, a signal to noise ratio (SNR), a signal noise plus interference ratio (SINR), or the like. The UE 215 may then use the measured channel parameter to infer which grant has a QCL relationship with which SSB beam.

In the depicted example, the UE 215 may steer its receive beam 630 to enhance reception of SSB beam 625, where the grant 610 has a QCL relationship with SSB beam 625. Because the receive beam 630 is steered to enhance reception of SSB beam 625, the UE 215 may deduce which one of grants 605 and 610 has a QCL relationship with SSB beam 625 based on having a higher measured channel parameter. In this example, the UE 215 may measure a SNR for a DMRS of PDCCH 0 corresponding to grant 605 and a SNR for a DMRS of PDCCH 0 corresponding to grant 610. In this example, the measured SNR for the DMRS of PDCCH 1 is higher than the measured SNR for the DMRS of PDCCH 0 due to the receive beam 630 being steered to enhance reception of SSB beam 625.

The UE 215 may deduce that the grant corresponding to the higher SNR (e.g., grant 610) has a QCL relationship with SSB beam 625, and that the grant corresponding to the lower SNR (e.g., grant 605) has a QCL relationship with SSB beam 620. In this example, the grant 605 allocates resources of PDSCH 635 in a first slot 640 and the grant 610 allocates resources of PDSCH 645 in a second slot 650. Based on the measured first channel parameter and the second channel parameter and in which of slots 640 and 650 the grants 605 and 610 allocate resources, the UE 215 may determine that a first parameter corresponds to the first time slot 640 and that the second parameter corresponds to the second time slot 650. The UE 215 may apply the first parameter to a first receive beam and for decoding of the PDSCH 635 within the first time slot 640, and apply the second parameter to a second receive beam and for decoding of the PDSCH 645 within the second time slot 650.

The UE 215 may additionally or alternatively use the measured channel parameters to determine whether to decode allocated resources of a PDSCH during the first time slot 640 and the second time slot 650. In some examples, the UE 215 may attempt to decode PDSCH resources associated with a stronger measured parameter (e.g., satisfies a SNR threshold) and may skip decoding of PDSCH resources associated with a weaker measured channel parameter (e.g., does not satisfy a SNR threshold).

In the example of FIG. 6, the UE 215 may estimate the channel parameters associated with the first grant 605 and the second grant 610. Based on the channel parameters, the UE 215 may determine not to decode the resources of the first PDSCH 635 during the first time slot 640. For example, the UE 215 may determine not to decode the resources of the first PDSCH 635 upon determining that the SNR of the DMRS associated with the first PDCCH 0 corresponding to grant 605 is poor (e.g., falls below a SNR threshold). Because of the QCL relationship, the SNR of the DMRS associated with the first grant 605 is indicative of SNR of the PDSCH 635, and hence is also expected to be poor. If the SNR of the DMRS associated with the first grant 605 is below a threshold, the UE 215 may determine that decoding the associated resources (e.g., first PDSCH 635) is expected to have a high error rate. Instead, the UE 215 may use receive beam 630 to receive a signal corresponding to the resources of the second PDSCH 645 included in the second time slot 650 that are allocated by the grant 610. The UE 215 may select to attempt to decode resources of the second PDSCH 645 due to the SNR of the DMRS associated with the PDCCH of grant 610 satisfies a threshold (e.g., is greater than a minimum SNR threshold). In some examples, the UE 215 may limit when it skips attempting to decode PDSCH resources when the higher SNR of the DMRS associated with the PDCCH of the other grant satisfies a higher threshold, rather than a minimum SNR threshold.

Figure 7:
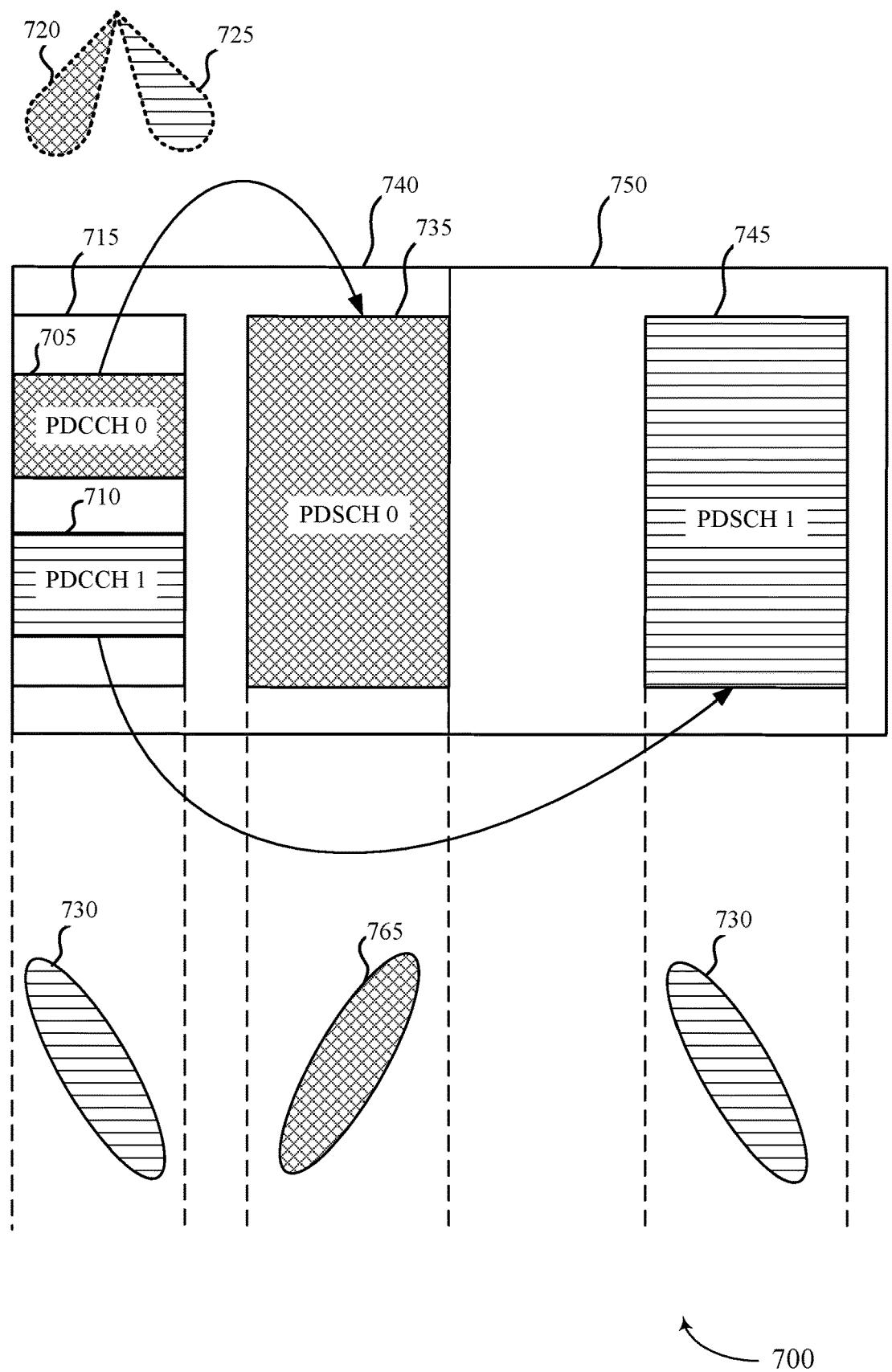
FIG. 7 illustrates an example scheduling technique that supports PDSCH reception when PDCCH with different spatial QCL assumptions are mapped to the same CORESET in accordance with aspects of the present disclosure.

FIG. 7 illustrates an example of a scheduling technique 700 that supports PDSCH reception when PDCCH with different spatial QCL assumptions are mapped to the same CORESET in accordance with aspects of the present disclosure. The technique of FIG. 7 may be performed by base station 205 and UE 215. The base station 205 and the UE 215 may be examples of the devices described herein.

In the example of FIG. 7, a UE 215 may receive a first grant 705 and a second grant 710 in a CORESET 715. The first grant 705 may be associated with a first SSB beam 720 and the second grant 710 may be associated with a second SSB beam 725. In some cases, the first grant 705 may be associated with a first parameter and the second grant 710 may be associated with the second parameter. The first parameter may be that the first grant 705 has a spatial QCL relationship with the first SSB beam 720, and the second parameter may be that the second grant 710 has a spatial QCL relationship with the second SSB beam 725. Since the second SSB beam 725 is different than the first SSB beam 720, the first grant 705 may have a different parameter from the second grant 710.

In some examples, the UE 215 may estimate a first channel parameter for a first DMRS within the CORESET 715 associated with the first grant 705 and a second channel parameter for a second DMRS within the CORESET 715 associated with the second grant 710. Based on the first channel parameter and the second channel parameter, the UE 215 may determine that a first parameter corresponds to the first time slot 740 and that the second parameter corresponds to the second time slot 750. In an example, each of the first channel parameter and the second channel parameter may be an SNR estimate, an SINR estimate, or both.

In some cases, the UE 215 may steer its receive beam to receive the CORESET 715 based on one of multiple spatial QCL assumptions. A measured channel parameter of a PDCCH DMRS of the grant corresponding to that spatial QCL assumption is expected to be higher than measured channel parameters for other grants decoded from the CORESET 715, and may be used to determine which grant corresponds to which QCL assumption.

In the depicted example, receive beam 730 is steered in a direction based on a QCL relationship with beam 725. Thus, a measured channel parameter of a PDCCH DMRS of grant 710 is expected to be greater than a measured channel parameter of a PDCCH DMRS of grant 705. Because grant 710 allocates resources of PDSCH 735 in slot 2, the UE 215 infers a QCL relationship between grant 710, SSB beam 725, and PDSCH 745. By process of elimination, the UE 215 infers a QCL relationship between grant 705, SSB beam 720, and PDSCH 735.

Based on identifying which QCL assumption corresponds to which grant, the UE 215 may adjust antenna weights of its receive beams in respective slots 740 and 750 to enhance reception of PDSCH 735 and 745. In an example, based on inferring a first QCL assumption of a QCL relationship between grant 705, SSB beam 720, and PDSCH 735, the UE 215 configures antenna weights of receive beam 765 to enhance reception of SSB beam 720 and receives PDSCH 735 in slot 740. Based on inferring a first QCL assumption of a QCL relationship between grant 710, SSB beam 725, and PDSCH 745, the UE 215 configures antenna weights of receive beam 730 to enhance reception of SSB beam 725 and receives PDSCH 745 in slot 750. The UE 215 may thus use measured channel parameters of SNR PDCCH associated with grants 705, 710 to infer QCL relationships that may be used to receive and decode PDSCH 735, 745.

Figure 8:
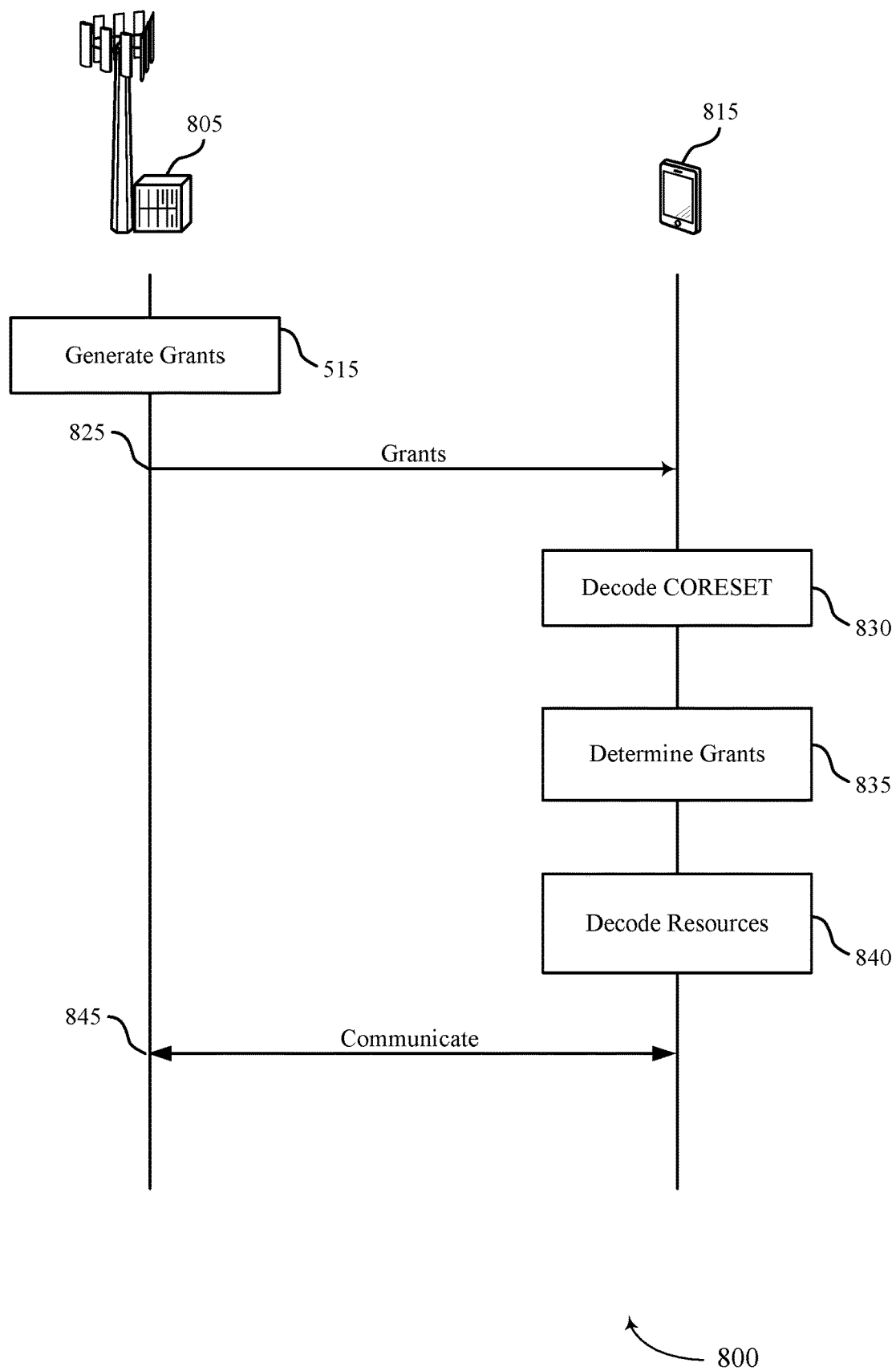
FIG. 8 illustrates an example of a process flow that supports PDSCH reception when PDCCH with different spatial QCL assumptions are mapped to the same CORESET in accordance with aspects of the present disclosure.

FIG. 8 illustrates an example of a process flow 800 that supports PDSCH reception when PDCCH with different spatial QCL assumptions are mapped to the same CORESET in accordance with aspects of the present disclosure. In some examples, the process flow 800 may implement aspects of the wireless communications system 100 and 200. Base station 805 and UE 815 may be examples of the corresponding devices described with reference to FIGS. 1 through 7.

In the following description of the process flow 800, the operations between the base station 805 and the UE 815 may be transmitted in a different order than the exemplary order shown, or the operations performed by the base station 805 and the UE 815 may be performed in different orders or at different times. Some operations may be left out of the process flow 800, or other operations may be added to the process flow 800.

At 820, the base station 805 may generate a first grant allocating first resources of a channel or signal within a first TTI of a plurality of different TTIs and a second grant allocating second resources of the channel or signal within a second TTI of the plurality of different TTIs. In some cases, the first grant may be included in a first PDCCH and the second grant may be included in a second PDCCH of a same CORESET. In some cases, the first grant is associated with a first parameter and the second grant is associated with a second parameter. In some cases, the first parameter is different than the second parameter.

At 825, the base station 805 may transmit the first grant and the second grant within a CORESET of the first TTI. In some cases, the base station 805 may transmit a payload in the first resources of a channel or signal (e.g., PDSCH) within the first TTI using a first SSB beam and in the second resources of a channel or signal within the second TTI using a second SSB beam. In some cases, the base station 805 may transmit a payload in a channel or signal. In some cases, the payload may be a RMSI payload.

At 830, the UE 815 may monitor a first TTI of a plurality of different TTIs to receive a CORESET. In some cases, the UE 815 may receive the CORESET via a receive beam. The UE 815 may then decode the CORESET to obtain a first grant and a second grant.

At 835, the UE 815 may determine that the first grant and the second grant are associated with different parameters mapped to the CORESET based on decoding multiple grants from the CORESET.

At 840, the UE 815 may decode resources of a channel or signal indicated in at least one of the first grant and the second grant. For example, the UE 815 may decode first resources of the channel or signal indicated in the first grant during the first TTI. The UE 815 may further decode second resources of the channel or signal indicated in the second grant during the second TTI.

At 845, the UE 815 may communicate with the base station 805 using the decoded resources.

It is noted that the examples described herein refer to a single CORESET having two grants that respectively allocate PDSCH resources in two consecutive time slots. The techniques described herein may be extended to single CORESET having two or more grants that respectively allocate PDSCH resources in two or more consecutive, or non-consecutive time slots.

Beneficially, the techniques described herein enable a UE enhance PDSCH reception, reduce complexity and latency, and improve performance when processing a CORESET that includes multiple PDCCHs that each have different parameters.

Figure 9:
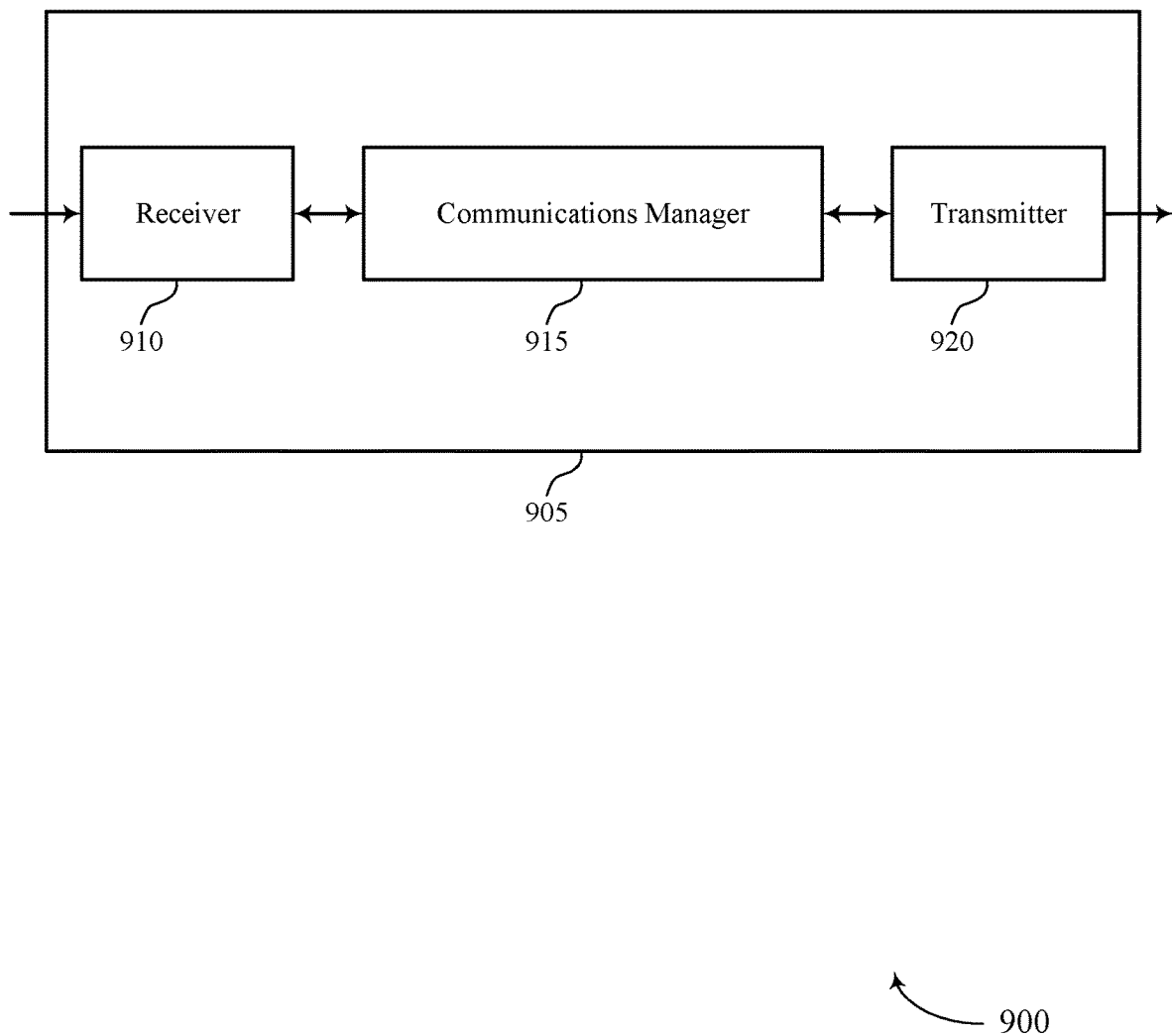
FIGS. 9 and 10 show block diagrams of devices that support PDSCH reception when PDCCH with different spatial QCL assumptions are mapped to the same CORESET in accordance with aspects of the present disclosure.

FIG. 9 shows a block diagram 900 of a device 905 that supports PDSCH reception when PDCCH with different spatial QCL assumptions are mapped to the same CORESET in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to PDSCH reception when PDCCH with different spatial QCL assumptions are mapped to the same CORESET, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may monitor, via a receive beam, a first TTI of a set of different TTIs for a CORESET, decode the CORESET to obtain a first grant and a second grant, determine that the first grant and the second grant are associated with different spatial QCL assumptions mapped to the CORESET based on decoding multiple grants from the CORESET, and decode, during at least one of the first TTI and a second TTI of the set different TTIs, resources of a channel or signal indicated in at least one of the first grant and the second grant. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
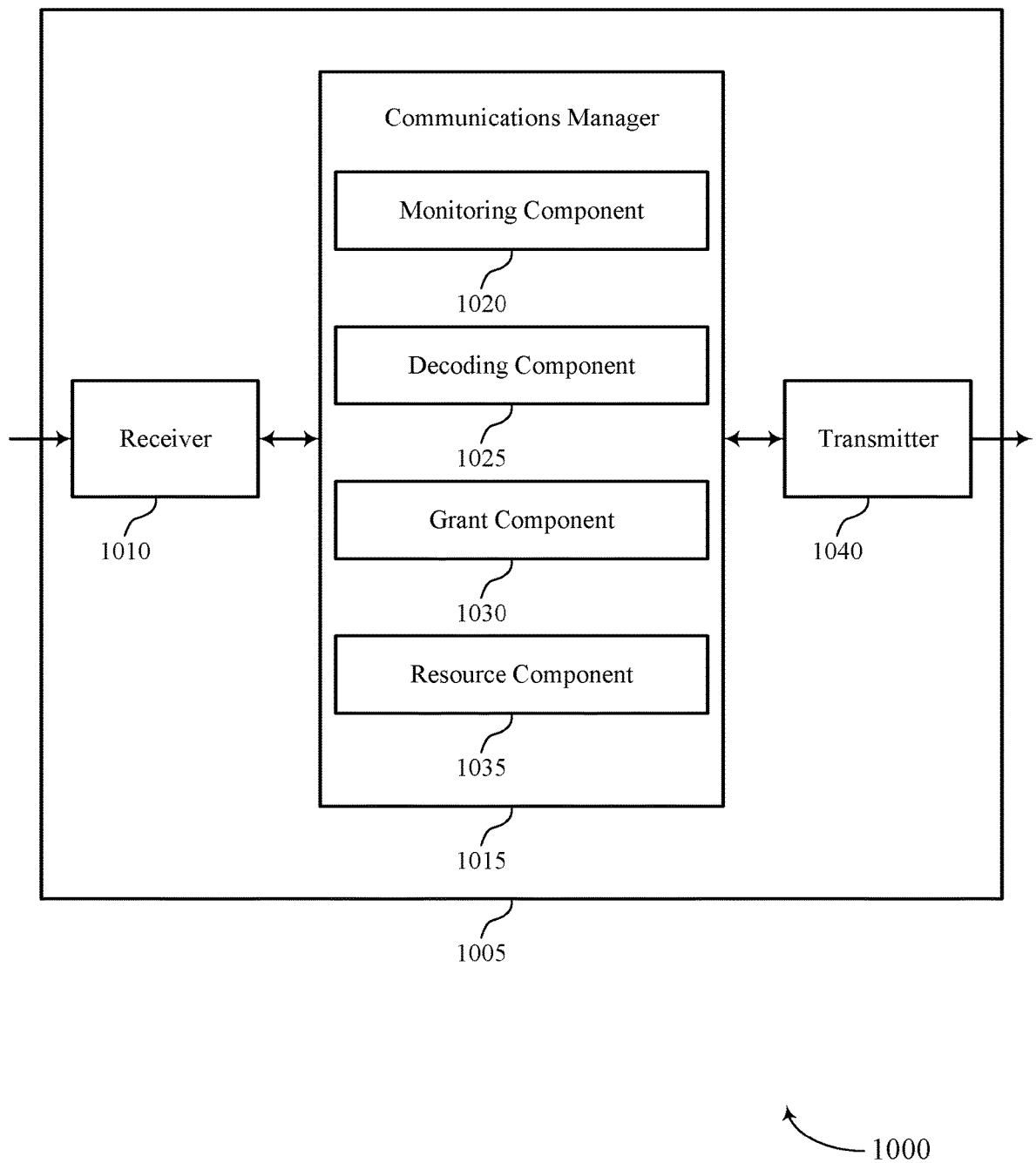

FIG. 10 shows a block diagram 1000 of a device 1005 that supports PDSCH reception when PDCCH with different parameters are mapped to the same CORESET in accordance with aspects of the present disclosure. The device 1005 may be an example of aspects of a device 905 or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to PDSCH reception when PDCCH with different parameters are mapped to the same CORESET, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a monitoring component 1020, a decoding component 1025, a grant component 1030, and a resource component 1035. The communications manager 1015 may be an example of aspects of the communications manager 1210 described herein.

The monitoring component 1020 may monitor, via a receive beam, a first TTI of a set of different TTIs for a CORESET. The decoding component 1025 may decode the CORESET to obtain a first grant and a second grant. The grant component 1030 may determine that the first grant and the second grant are associated with different parameters mapped to the CORESET based on decoding multiple grants from the CORESET. The resource component 1035 may decode, during at least one of the first TTI and a second TTI of the set different TTIs, resources of a channel or signal indicated in at least one of the first grant and the second grant.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
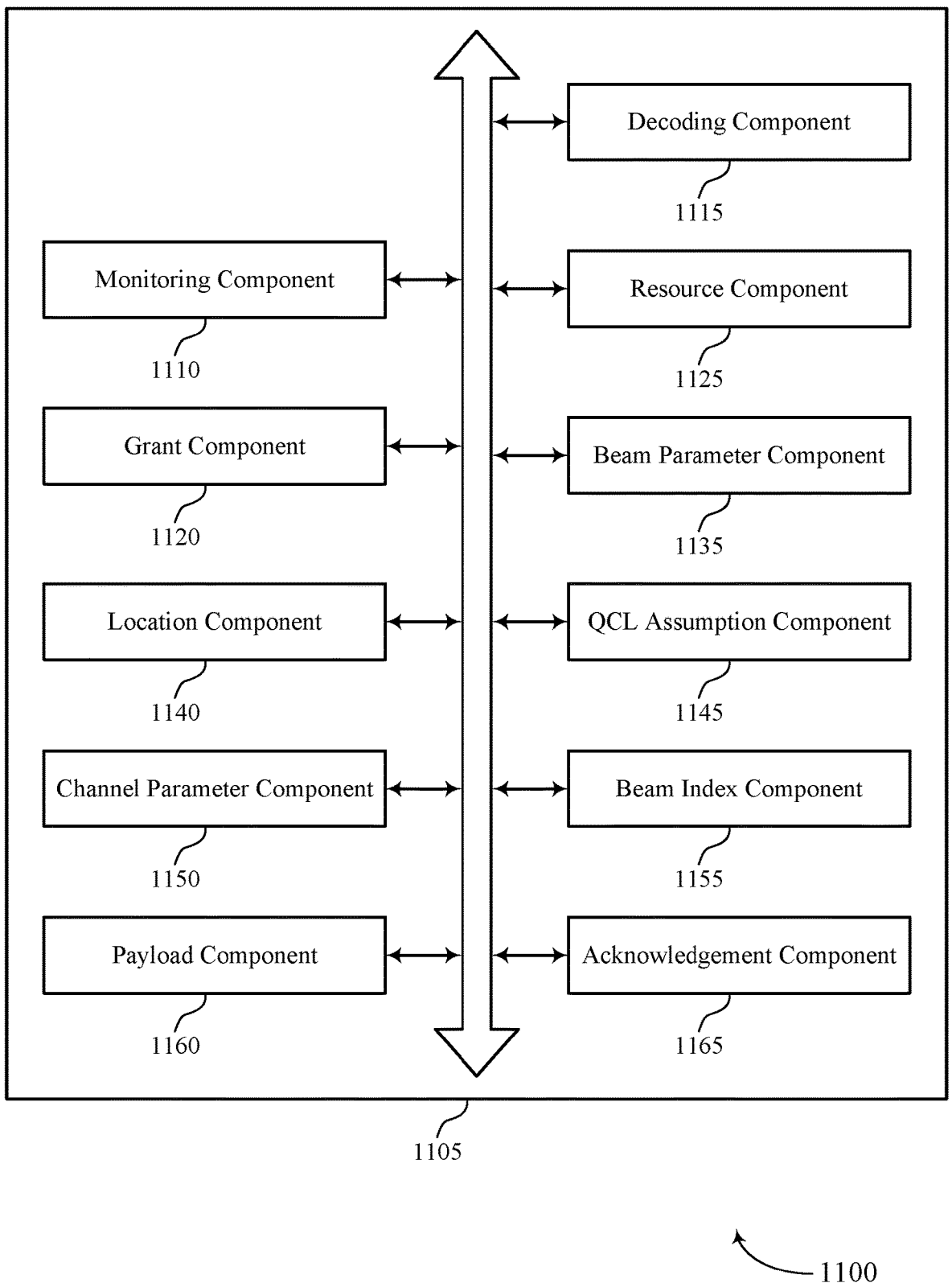
FIG. 11 shows a block diagram of a device that supports PDSCH reception when PDCCH with different spatial QCL assumptions are mapped to the same CORESET in accordance with aspects of the present disclosure.

FIG. 11 shows a block diagram 1100 of a communications manager 1105 that supports PDSCH reception when PDCCH with different spatial QCL assumptions are mapped to the same CORESET in accordance with aspects of the present disclosure. The communications manager 1105 may be an example of aspects of a communications manager 915, a communications manager 1015, or a communications manager 1210 described herein. The communications manager 1105 may include a monitoring component 1110, a decoding component 1115, a grant component 1120, a resource component 1125, a beam parameter component 1135, a location component 1140, a QCL assumption component 1145, a channel parameter component 1150, a beam index component 1155, a payload component 1160, and an acknowledgement component 1165. Each of these modules may communicate, directly or indirectly, with one another (e.g., via one or more buses).

The monitoring component 1110 may monitor, via a receive beam, a first TTI of a set of different TTIs for a CORESET. In some examples, the monitoring component 1110 may monitor, using the receive beam, first resources of the channel or signal corresponding to the first grant during the first TTI and second resources of the channel or signal corresponding to the second grant during the second TTI.

In some examples, the monitoring component 1110 may monitor first resources of the channel or signal during the first TTI using the first receive beam and second resources of the channel or signal during the second TTI using the second receive beam. In some cases, the channel or signal may include a shared data channel.

The decoding component 1115 may decode the CORESET to obtain a first grant and a second grant. In some examples, the decoding component 1115 may determine not to decode the resources of the channel or signal during one of the first TTI or the second TTI based on the first channel parameter or the second channel parameter.

In some examples, the decoding component 1115 may determine to decode first resources of the channel or signal during the first TTI and second resources of the channel or signal during the second TTI based on the first channel parameter or the second channel parameter. In some examples, the decoding component 1115 may decode the CORESET to obtain the first grant and the second grant in accordance with one of the first parameter or the second parameter. In some examples, the decoding component 1115 may decode a set of decoding candidates within a common search space corresponding to the CORESET to obtain the first grant and the second grant.

The grant component 1120 may determine that the first grant and the second grant are associated with different parameters mapped to the CORESET based on decoding multiple grants from the CORESET. The resource component 1125 may decode, during at least one of the first TTI and a second TTI of the set different TTIs, resources of a channel or signal indicated in at least one of the first grant and the second grant. In some examples, the resource component 1125 may decode the first resources of the channel or signal corresponding to the first grant.

In some examples, the resource component 1125 may decode the second resources of the channel or signal corresponding to the second grant. In some examples, the resource component 1125 may decode first resources of the channel or signal corresponding to the first grant during the first TTI based on the first parameter.

In some examples, the resource component 1125 may decode second resources of the channel or signal corresponding to the second grant during the second TTI based on the second parameter. In some examples, the resource component 1125 may decode the first resources of the channel or signal based on the first parameter and the second resources of the channel or signal based on the second parameter. In some cases, a first parameter of the different parameters is that the first grant has a spatial QCL relationship with a first SSB beam and/or a first reference signal, and a second parameter of the different parameters is that the second grant has a spatial QCL relationship with a second SSB beam and/or a second reference signal that is different than the first SSB beam and/or the first reference signal.

The beam parameter component 1135 may set at least one beam parameter of a first receive beam based on the first parameter and at least one beam parameter of a second receive beam based on the second parameter. The location component 1140 may determine a location of the first grant within the CORESET and a location of the second grant within the CORESET. In some cases, the location of the first grant and the location of the second grant respectively correspond to different CCE indexes. In some cases, the location of the first grant and the location of the second grant respectively correspond to different time and frequency resources within the CORESET.

The QCL assumption component 1145 may determine that a first parameter of the different parameters corresponds to the first TTI based on the location of the first grant. In some examples, the QCL assumption component 1145 may determine that a second parameter of the different parameters corresponds to the second TTI based on the location of the second grant. In some examples, the QCL assumption component 1145 may determine that a first parameter of the different parameters corresponds to the first TTI based on the first TTI occurring before the second TTI.

In some examples, the QCL assumption component 1145 may determine that a second parameter of the different parameters corresponds to the second TTI based on the second TTI occurring after the first TTI. In some examples, the QCL assumption component 1145 may determine that a first parameter of the different parameters corresponds to the first TTI based on the first grant allocating first resources of the channel or signal within the first TTI. In some examples, the QCL assumption component 1145 may determine that a second parameter of the different parameters corresponds to the second TTI based on the second grant allocating second resources of the channel or signal within the second TTI.

In some examples, the QCL assumption component 1145 may determine that a first parameter of the different parameters corresponds to the first TTI based on the first channel parameter and the second channel parameter. In some examples, the QCL assumption component 1145 may determine that a second parameter of the different parameters corresponds to the second TTI based on the first channel parameter and the second channel parameter.

In some examples, the QCL assumption component 1145 may determine that a first parameter of the different parameters corresponds to the first TTI based on the first grant allocating first resources of the channel or signal within the first TTI that are frequency division multiplexed with a first SSB. In some examples, the QCL assumption component 1145 may determine that a second parameter of the different parameters corresponds to the second TTI based on the second grant allocating second resources of the channel or signal within the second TTI that are frequency division multiplexed with a first SSB.

The channel parameter component 1150 may estimate a first channel parameter for a first DMRS within the CORESET associated with the first grant and a second channel parameter for a second DMRS within the CORESET associated with the second grant. In some examples, the channel parameter component 1150 may determine which of the first parameter or the second parameter is associated with the first grant based on the first channel parameter and the second channel parameter. In some cases, each of the first channel parameter and the second channel parameter is SNR estimate, a SINR estimate, or both.

The beam index component 1155 may identify a beam index associated with a SSB beam. In some cases, a beam index of a first SSB beam corresponds to a first parameter of the different QCL assumptions and a beam index of a second SSB beam corresponds to a second parameter of the different QCL assumptions. The payload component 1160 may determine a payload to be transported in a channel or signal. In some cases, a payload is transported in the channel or signal via a first SSB beam during the first TTI and via a second SSB beam during the second TTI. In some cases, the payload includes a RMSI payload. The acknowledgement component 1165 may transmit acknowledgement feedback indicating whether decoding of the payload was successful.

Figure 12:
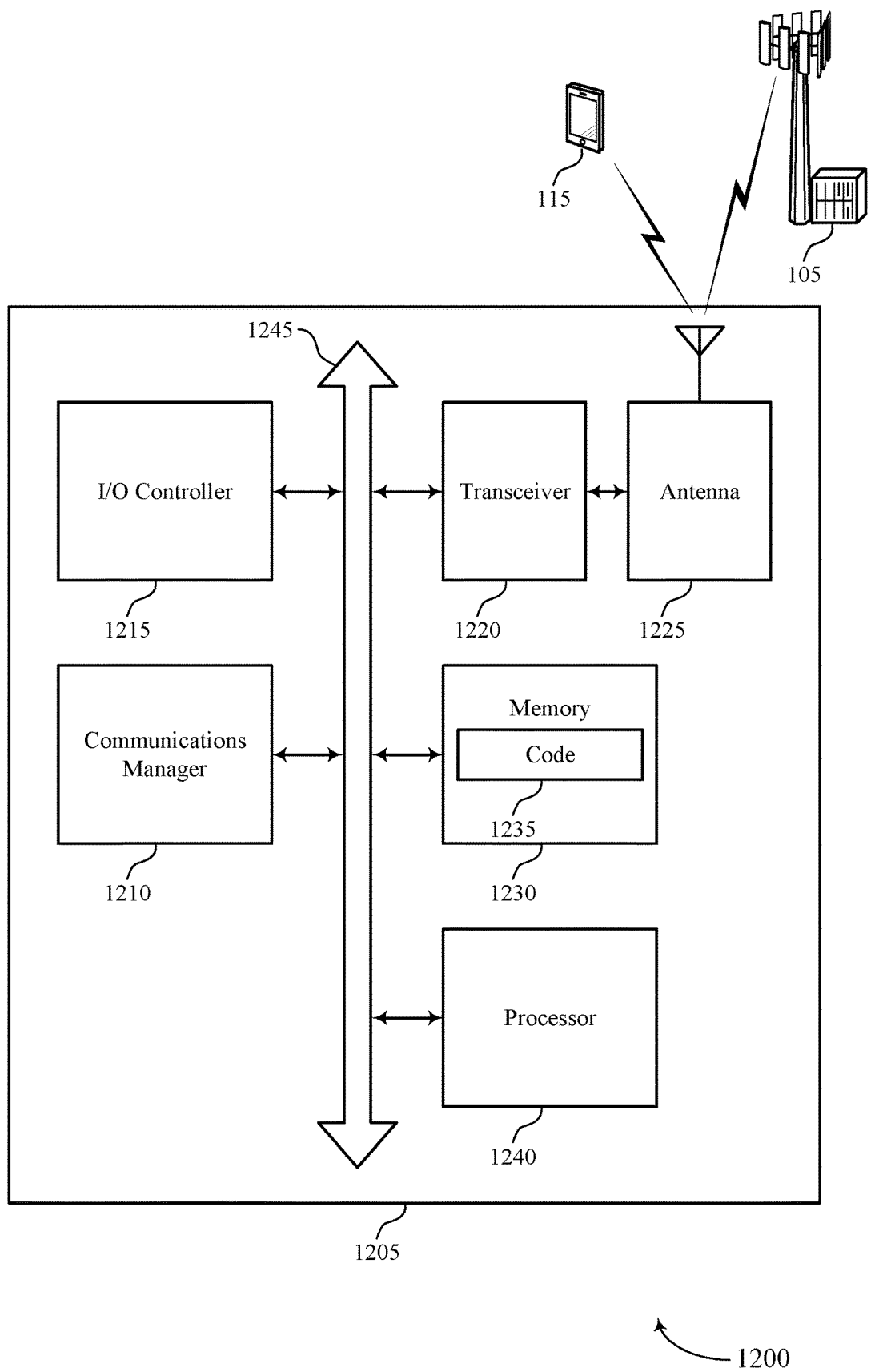
FIG. 12 shows a diagram of a system including a device that supports PDSCH reception when PDCCH with different spatial QCL assumptions are mapped to the same CORESET in accordance with aspects of the present disclosure.

FIG. 12 shows a diagram of a system 1200 including a device 1205 that supports PDSCH reception when PDCCH with different parameters are mapped to the same CORESET in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may monitor, via a receive beam, a first TTI of a set of different TTIs for a CORESET, decode the CORESET to obtain a first grant and a second grant, determine that the first grant and the second grant are associated with different parameters mapped to the CORESET based on decoding multiple grants from the CORESET, and decode, during at least one of the first TTI and a second TTI of the set different TTIs, resources of a channel or signal indicated in at least one of the first grant and the second grant.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting PDSCH reception when PDCCH with different parameters are mapped to the same CORESET).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
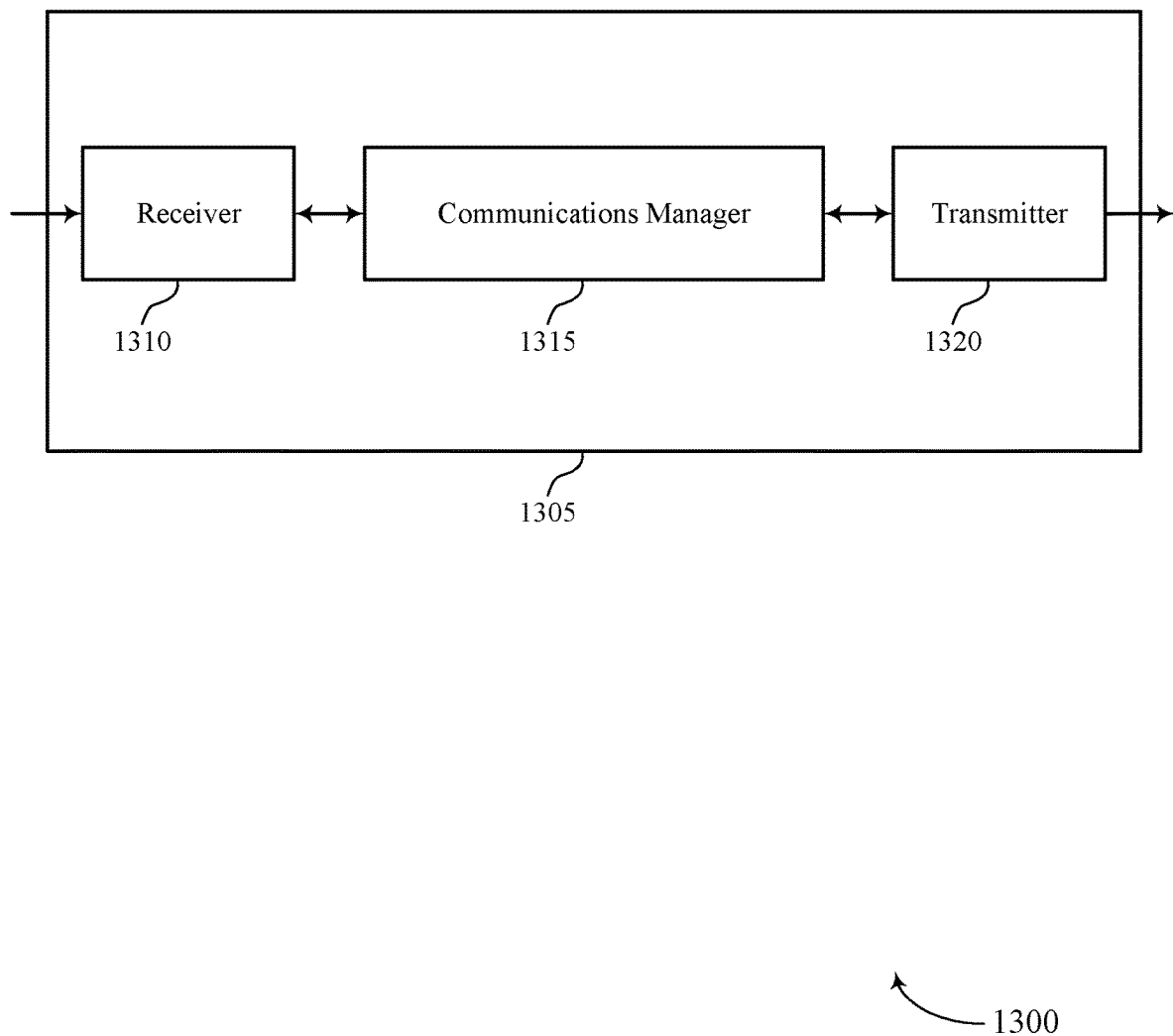
FIGS. 13 and 14 show block diagrams of devices that support PDSCH reception when PDCCH with different spatial QCL assumptions are mapped to the same CORESET in accordance with aspects of the present disclosure.

FIG. 13 shows a block diagram 1300 of a device 1305 that supports PDSCH reception when PDCCH with different spatial QCL assumptions are mapped to the same CORESET in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to PDSCH reception when PDCCH with different spatial QCL assumptions are mapped to the same CORESET, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may generate a first grant allocating first resources of a channel or signal within a first TTI of a set of different TTIs and a second grant allocating second resources of the channel or signal within a second TTI of the set of different TTIs and transmit the first grant and the second grant within a CORESET of the first TTI, the first grant being associated with a first spatial QCL assumption and the second grant being associated with a second spatial QCL assumption that is different than the first spatial QCL assumption. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
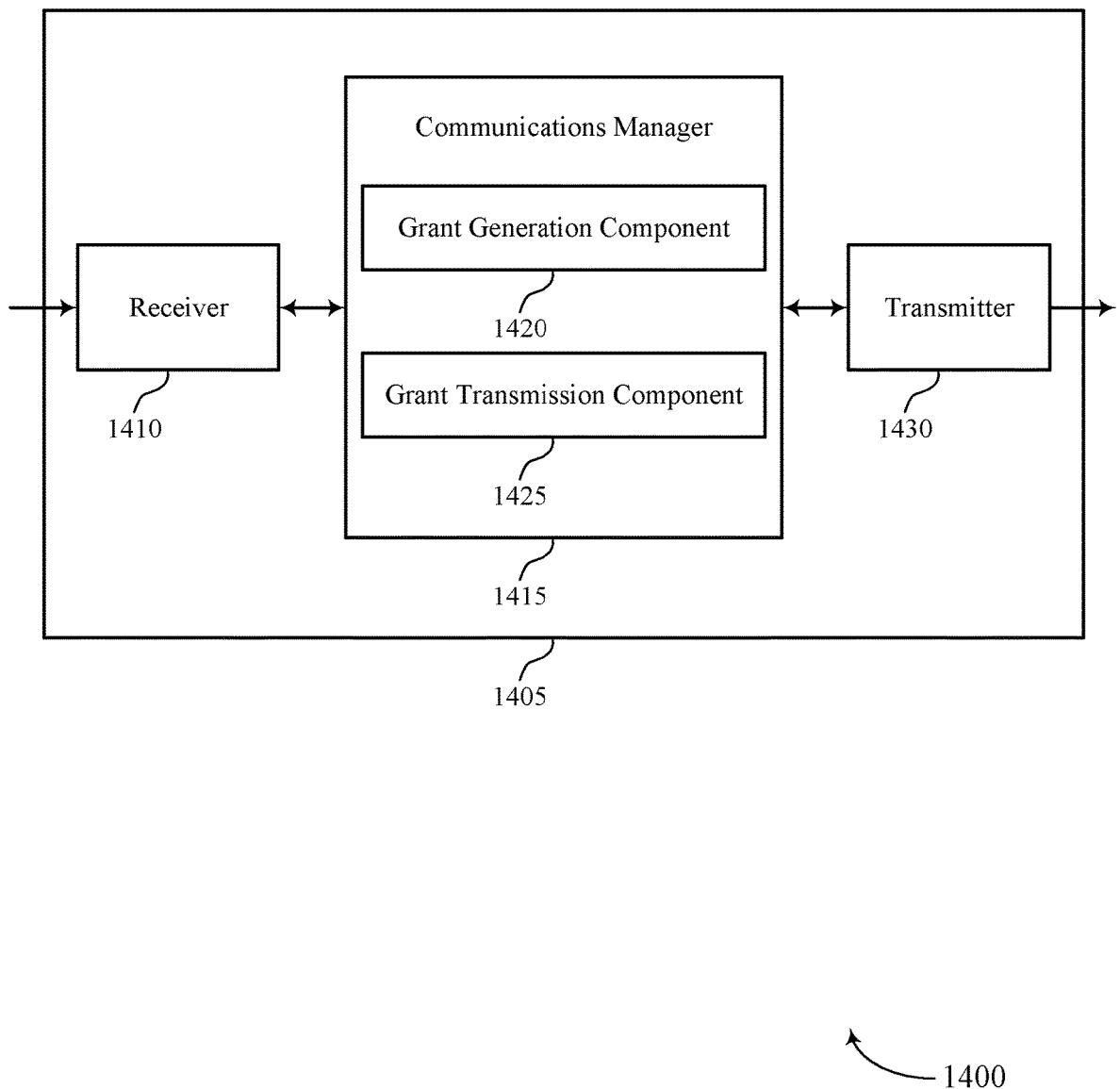

FIG. 14 shows a block diagram 1400 of a device 1405 that supports PDSCH reception when PDCCH with different spatial QCL assumptions are mapped to the same CORESET in accordance with aspects of the present disclosure. The device 1405 may be an example of aspects of a device 1305 or a base station 105 as described herein. The device 1405 may include a receiver 1410, a communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to PDSCH reception when PDCCH with different spatial QCL assumptions are mapped to the same CORESET, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a grant generation component 1420 and a grant transmission component 1425. The communications manager 1415 may be an example of aspects of the communications manager 1610 described herein. The grant generation component 1420 may generate a first grant allocating first resources of a channel or signal within a first TTI of a set of different TTIs and a second grant allocating second resources of the channel or signal within a second TTI of the set of different TTIs. In some cases, the channel or signal may include a shared data channel. The grant transmission component 1425 may transmit the first grant and the second grant within a CORESET of the first TTI, the first grant being associated with a first parameter and the second grant being associated with a second parameter that is different than the first parameter.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
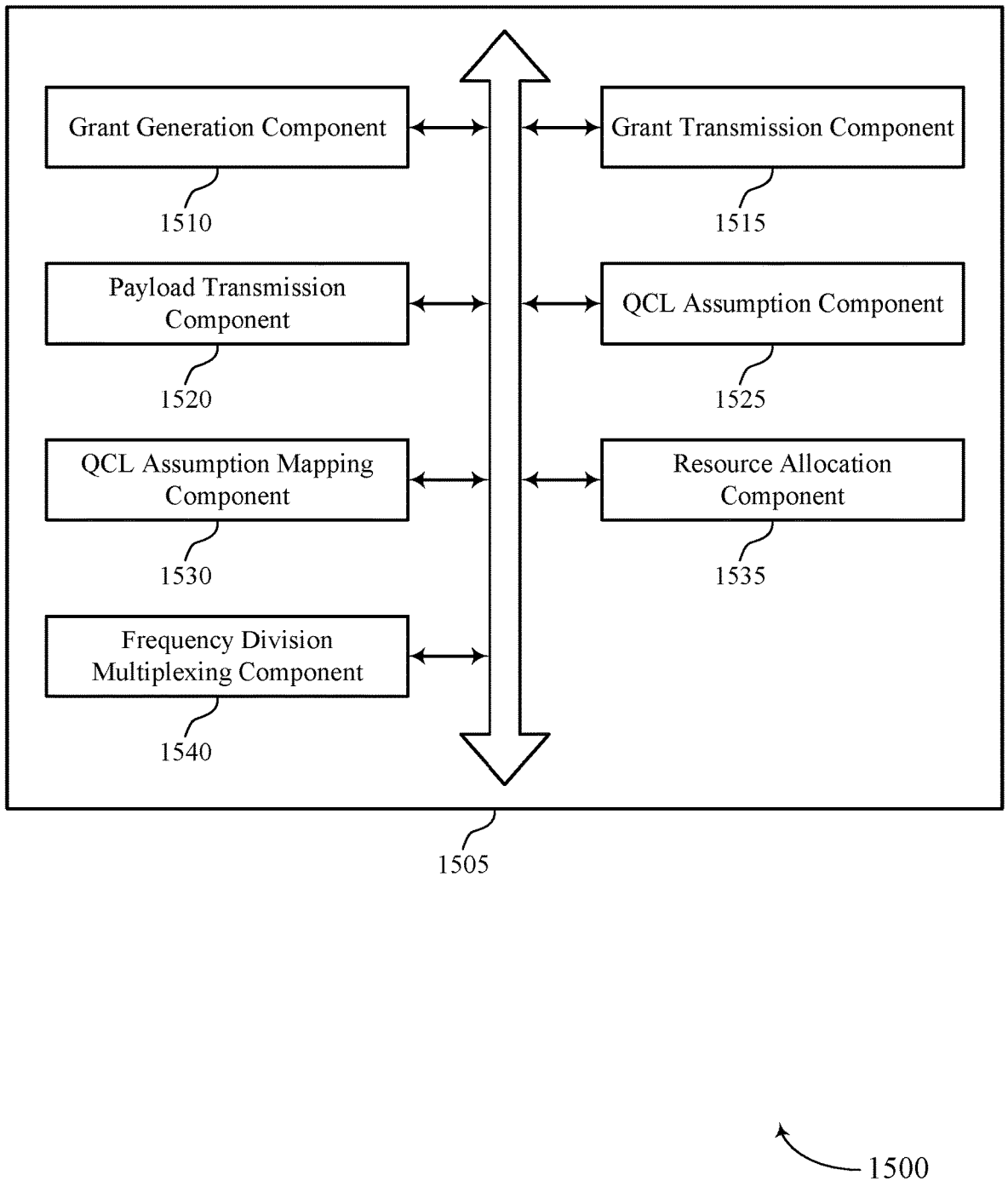
FIG. 15 shows a block diagram of a device that supports PDSCH reception when PDCCH with different spatial QCL assumptions are mapped to the same CORESET in accordance with aspects of the present disclosure.

FIG. 15 shows a block diagram 1500 of a communications manager 1505 that supports PDSCH reception when PDCCH with different spatial QCL assumptions are mapped to the same CORESET in accordance with aspects of the present disclosure. The communications manager 1505 may be an example of aspects of a communications manager 1315, a communications manager 1415, or a communications manager 1610 described herein. The communications manager 1505 may include a grant generation component 1510, a grant transmission component 1515, a payload transmission component 1520, a QCL assumption component 1525, a QCL assumption mapping component 1530, a resource allocation component 1535, and a frequency division multiplexing component 1540. Each of these modules may communicate, directly or indirectly, with one another (e.g., via one or more buses).

The grant generation component 1510 may generate a first grant allocating first resources of a channel or signal within a first TTI of a set of different TTIs and a second grant allocating second resources of the channel or signal within a second TTI of the set of different TTIs. The grant transmission component 1515 may transmit the first grant and the second grant within a CORESET of the first TTI, the first grant being associated with a first parameter and the second grant being associated with a second parameter that is different than the first parameter.

In some examples, the grant transmission component 1515 may transmit the first grant at a first location within the CORESET to indicate that the first grant is associated within the first parameter. In some examples, the grant transmission component 1515 may transmit the second grant at a second location within the CORESET to indicate that the second grant is associated within the second parameter. In some cases, the first location corresponds to a first CCE index and the second location corresponds to a second CCE index. In some cases, the first location and the second location respectively correspond to different time and frequency resources within the CORESET.

The payload transmission component 1520 may transmit a payload in the first resources of the first TTI using a first SSB beam and in the second resources of the second TTI using a second SSB beam. The QCL assumption component 1525 may determine parameters. In some cases, a first parameter is that the first grant has a spatial QCL relationship with a first SSB beam and/or a first reference signal, and a second parameter is that the second grant has a spatial QCL relationship with a second SSB beam and/or a second reference signal that is different than the first SSB beam and/or the first reference signal. The QCL assumption mapping component 1530 may determine that the first grant and the second grant are associated with different parameters mapped to the CORESET. In some examples, the QCL assumption mapping component 1530 may generate the first grant and the second grant to schedule transmission of a payload in multiple different TTIs of the set of different TTIs.

The resource allocation component 1535 may generate the first grant to allocate the first resources within the first TTI to indicate that the first grant is associated within the first parameter. In some examples, the resource allocation component 1535 may generate the second grant to allocate the second resources within the second TTI to indicate that the second grant is associated within the second parameter.

The frequency division multiplexing component 1540 may generate a transmission that frequency division multiplexes a first SSB with the first resources of the channel or signal within the first TTI to indicate that the first grant is associated within the first parameter and frequency division multiplexes a second SSB with the second resources of the channel or signal within the second TTI to indicate that the second grant is associated within the second parameter. In some examples, the frequency division multiplexing component 1540 may transmit the transmission.

Figure 16:
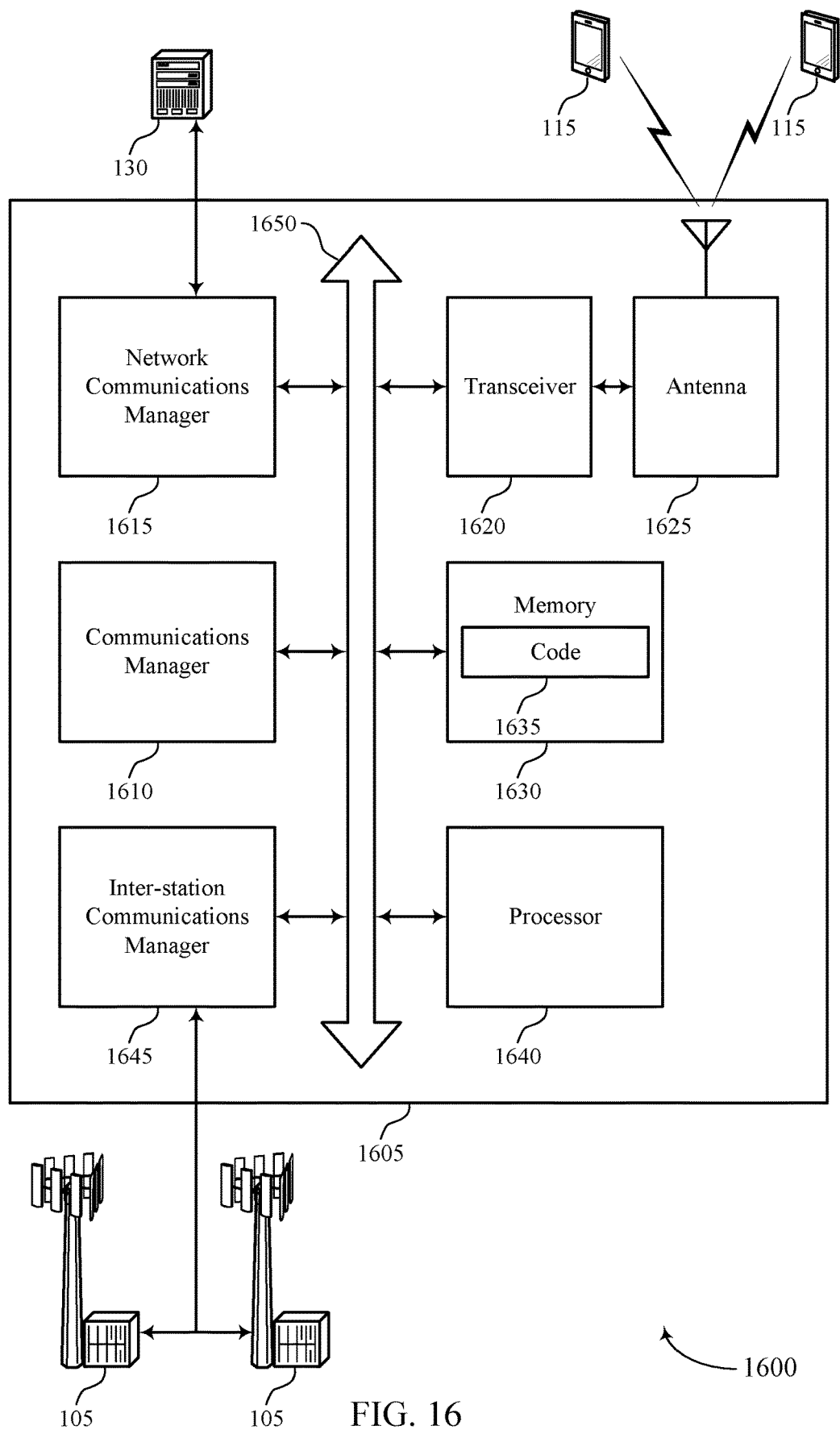
FIG. 16 shows a diagram of a system including a device that supports PDSCH reception when PDCCH with different spatial QCL assumptions are mapped to the same CORESET in accordance with aspects of the present disclosure.

FIG. 16 shows a diagram of a system 1600 including a device 1605 that supports PDSCH reception when PDCCH with different spatial QCL assumptions are mapped to the same CORESET in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may generate a first grant allocating first resources of a channel or signal within a first TTI of a set of different TTIs and a second grant allocating second resources of the channel or signal within a second TTI of the set of different TTIs and transmit the first grant and the second grant within a CORESET of the first TTI, the first grant being associated with a first spatial QCL assumption and the second grant being associated with a second spatial QCL assumption that is different than the first spatial QCL assumption.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device # {device} to perform various functions (e.g., functions or tasks supporting PDSCH reception when PDCCH with different spatial QCL assumptions are mapped to the same CORESET).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
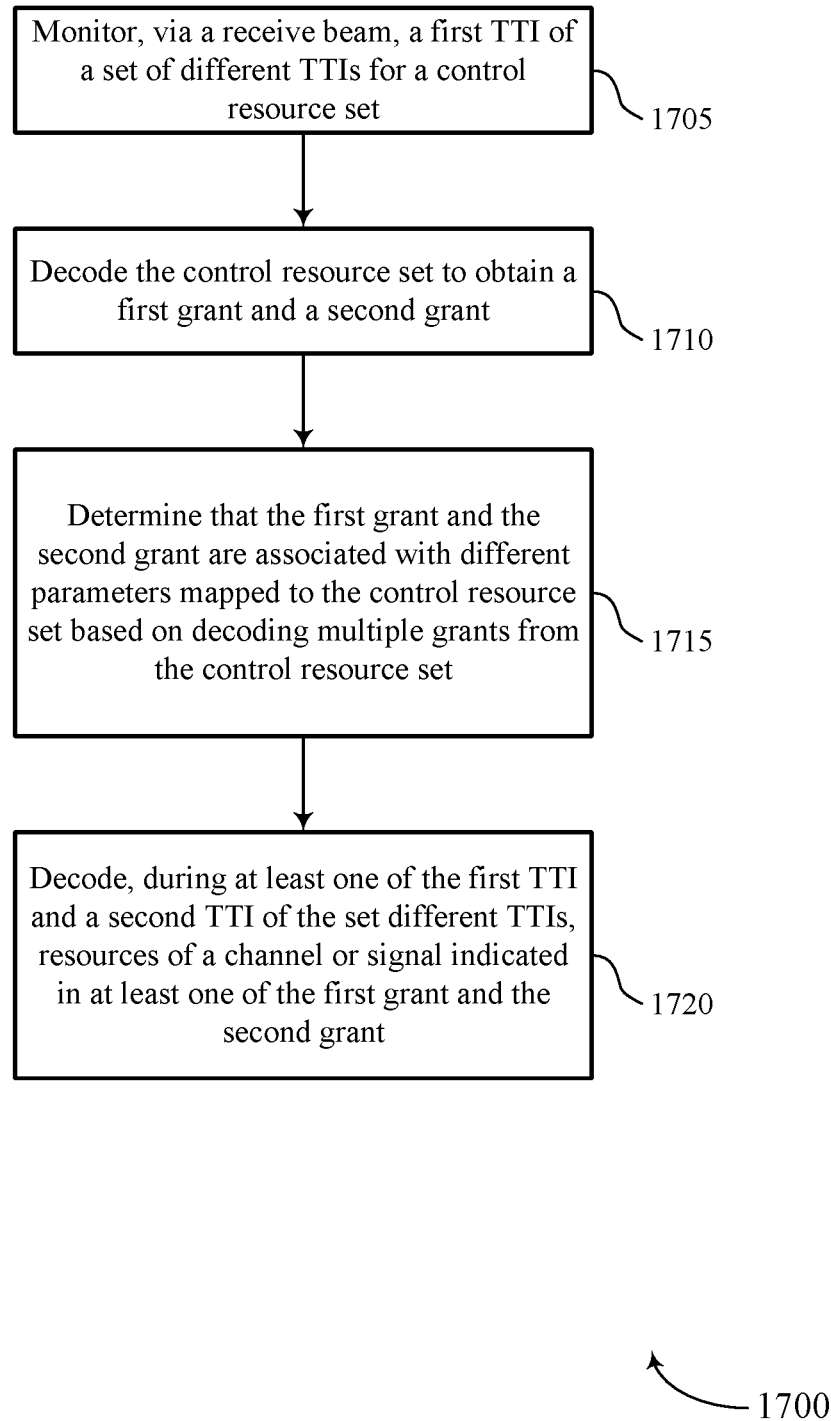
FIGS. 17 through 20 show flowcharts illustrating methods that support PDSCH reception when PDCCH with different spatial QCL assumptions are mapped to the same CORESET in accordance with aspects of the present disclosure.

FIG. 17 shows a flowchart illustrating a method 1700 that supports PDSCH reception when PDCCH with different spatial QCL assumptions are mapped to the same CORESET in accordance with aspects of the present disclosure. The operations of method 1700 may be implemented by a UE 115 or its components as described herein. For example, the operations of method 1700 may be performed by a communications manager as described with reference to FIGS. 9 to 12. In some examples, a UE may execute a set of instructions to control the functional elements of the UE to perform the functions described below. Additionally or alternatively, a UE may perform aspects of the functions described below using special-purpose hardware.

At 1705, the UE may monitor, via a receive beam, a first TTI of a set of different TTIs for a CORESET. The operations of 1705 may be performed according to the methods described herein. In some examples, aspects of the operations of 1705 may be performed by a monitoring component as described with reference to FIGS. 9 to 12.

At 1710, the UE may decode the CORESET to obtain a first grant and a second grant. The operations of 1710 may be performed according to the methods described herein. In some examples, aspects of the operations of 1710 may be performed by a decoding component as described with reference to FIGS. 9 to 12.

At 1715, the UE may determine that the first grant and the second grant are associated with different parameters mapped to the CORESET based on decoding multiple grants from the CORESET. The operations of 1715 may be performed according to the methods described herein. In some examples, aspects of the operations of 1715 may be performed by a grant component as described with reference to FIGS. 9 to 12.

At 1720, the UE may decode, during at least one of the first TTI and a second TTI of the set different TTIs, resources of a channel or signal indicated in at least one of the first grant and the second grant. The operations of 1720 may be performed according to the methods described herein. In some examples, aspects of the operations of 1720 may be performed by a resource component as described with reference to FIGS. 9 to 12.

Figure 18:
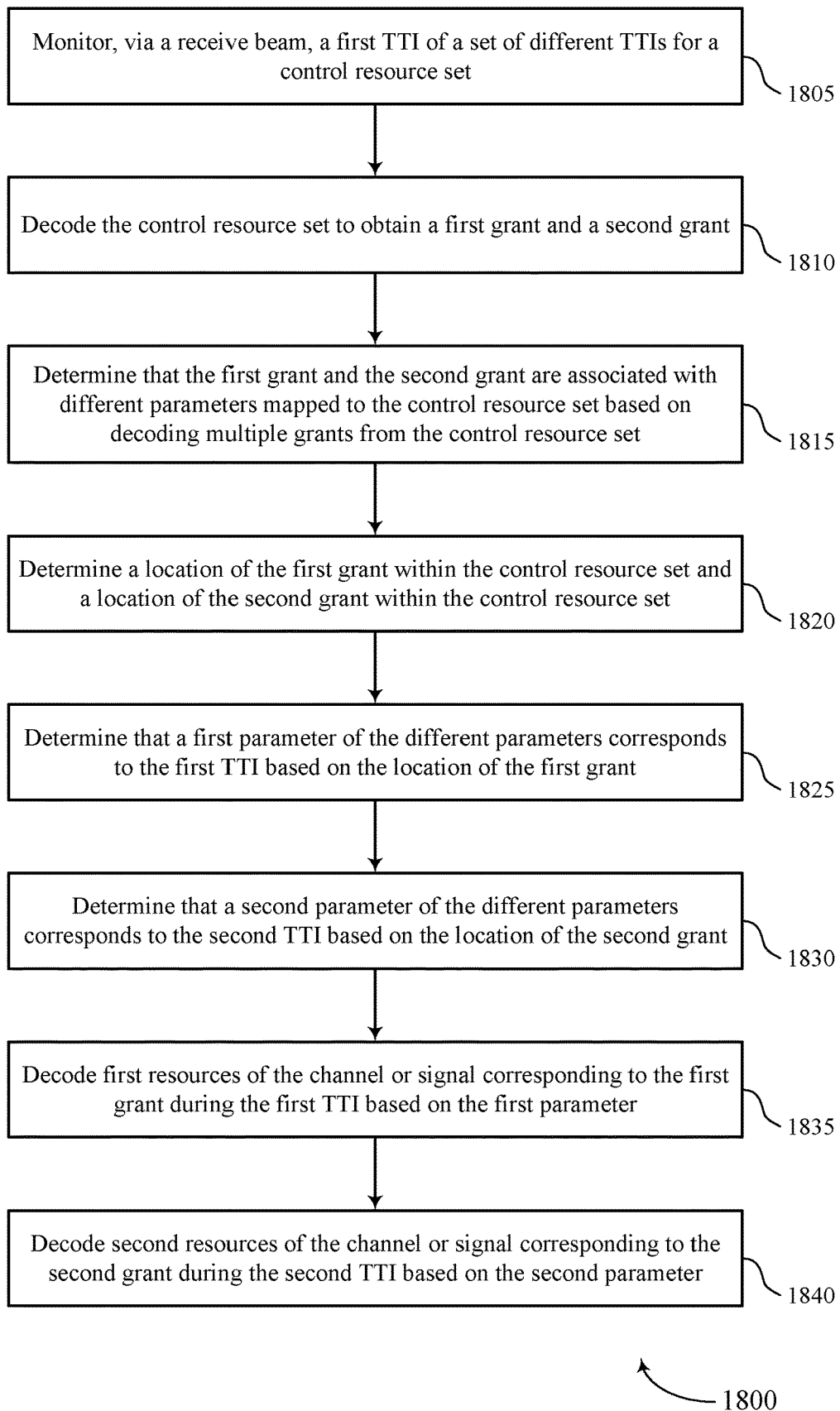

FIG. 18 shows a flowchart illustrating a method 1800 that supports PDSCH reception when PDCCH with different spatial QCL assumptions are mapped to the same CORESET in accordance with aspects of the present disclosure. The operations of method 1800 may be implemented by a UE 115 or its components as described herein. For example, the operations of method 1800 may be performed by a communications manager as described with reference to FIGS. 9 to 12. In some examples, a UE may execute a set of instructions to control the functional elements of the UE to perform the functions described below. Additionally or alternatively, a UE may perform aspects of the functions described below using special-purpose hardware.

At 1805, the UE may monitor, via a receive beam, a first TTI of a set of different TTIs for a CORESET. The operations of 1805 may be performed according to the methods described herein. In some examples, aspects of the operations of 1805 may be performed by a monitoring component as described with reference to FIGS. 9 to 12.

At 1810, the UE may decode the CORESET to obtain a first grant and a second grant. The operations of 1810 may be performed according to the methods described herein. In some examples, aspects of the operations of 1810 may be performed by a decoding component as described with reference to FIGS. 9 to 12.

At 1815, the UE may determine that the first grant and the second grant are associated with different parameters mapped to the CORESET based on decoding multiple grants from the CORESET. The operations of 1815 may be performed according to the methods described herein. In some examples, aspects of the operations of 1815 may be performed by a grant component as described with reference to FIGS. 9 to 12.

At 1820, the UE may determine a location of the first grant within the CORESET and a location of the second grant within the CORESET. The operations of 1820 may be performed according to the methods described herein. In some examples, aspects of the operations of 1820 may be performed by a location component as described with reference to FIGS. 9 to 12.

At 1825, the UE may determine that a first parameter of the different parameters corresponds to the first TTI based on the location of the first grant. The operations of 1825 may be performed according to the methods described herein. In some examples, aspects of the operations of 1825 may be performed by a QCL assumption component as described with reference to FIGS. 9 to 12.

At 1830, the UE may determine that a second parameter of the different parameters corresponds to the second TTI based on the location of the second grant. The operations of 1830 may be performed according to the methods described herein. In some examples, aspects of the operations of 1830 may be performed by a QCL assumption component as described with reference to FIGS. 9 to 12.

At 1835, the UE may decode first resources of the channel or signal corresponding to the first grant during the first TTI based on the first parameter. The operations of 1835 may be performed according to the methods described herein. In some examples, aspects of the operations of 1835 may be performed by a resource component as described with reference to FIGS. 9 to 12.

At 1840, the UE may decode second resources of the channel or signal corresponding to the second grant during the second TTI based on the second parameter. The operations of 1840 may be performed according to the methods described herein. In some examples, aspects of the operations of 1840 may be performed by a resource component as described with reference to FIGS. 9 to 12.

Figure 19:
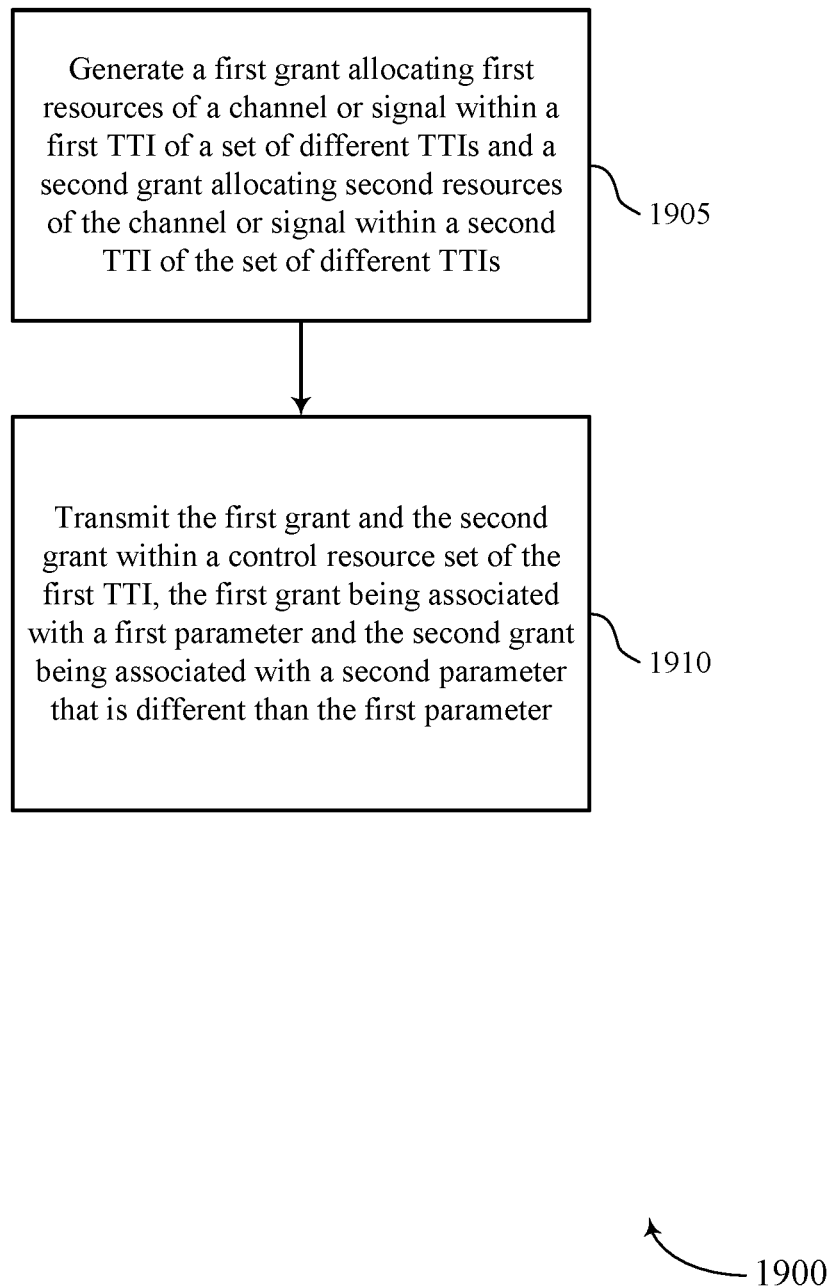

FIG. 19 shows a flowchart illustrating a method 1900 that supports PDSCH reception when PDCCH with different spatial QCL assumptions are mapped to the same CORESET in accordance with aspects of the present disclosure. The operations of method 1900 may be implemented by a base station 105 or its components as described herein. For example, the operations of method 1900 may be performed by a communications manager as described with reference to FIGS. 13 to 16. In some examples, a base station may execute a set of instructions to control the functional elements of the base station to perform the functions described below. Additionally or alternatively, a base station may perform aspects of the functions described below using special-purpose hardware.

At 1905, the base station may generate a first grant allocating first resources of a channel or signal within a first TTI of a set of different TTIs and a second grant allocating second resources of the channel or signal within a second TTI of the set of different TTIs. The operations of 1905 may be performed according to the methods described herein. In some examples, aspects of the operations of 1905 may be performed by a grant generation component as described with reference to FIGS. 13 to 16.

At 1910, the base station may transmit the first grant and the second grant within a CORESET of the first TTI, the first grant being associated with a first parameter and the second grant being associated with a second parameter that is different than the first parameter. The operations of 1910 may be performed according to the methods described herein. In some examples, aspects of the operations of 1910 may be performed by a grant transmission component as described with reference to FIGS. 13 to 16.

Figure 20:
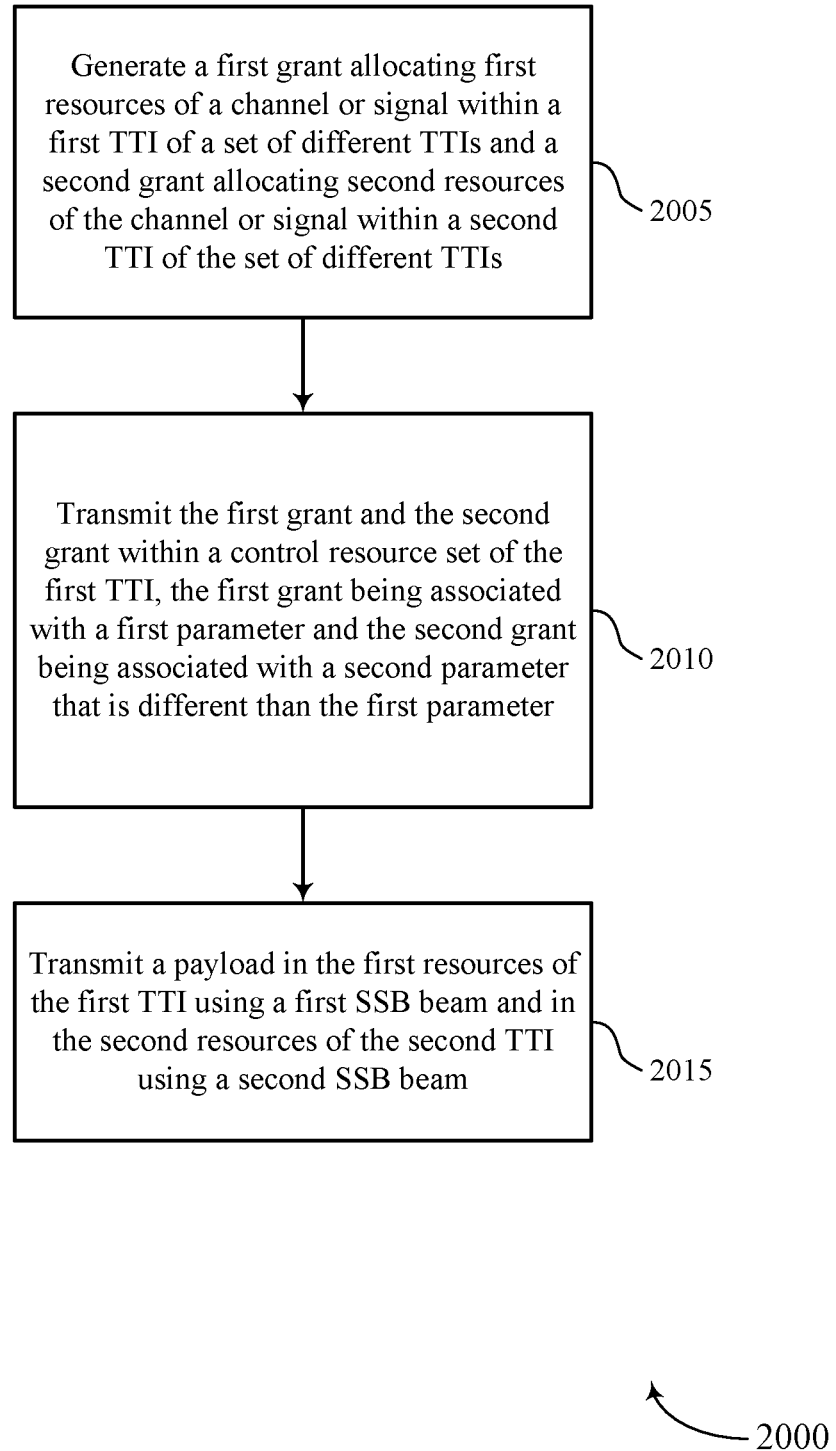

FIG. 20 shows a flowchart illustrating a method 2000 that supports PDSCH reception when PDCCH with different spatial QCL assumptions are mapped to the same CORESET in accordance with aspects of the present disclosure. The operations of method 2000 may be implemented by a base station 105 or its components as described herein. For example, the operations of method 2000 may be performed by a communications manager as described with reference to FIGS. 13 to 16. In some examples, a base station may execute a set of instructions to control the functional elements of the base station to perform the functions described below. Additionally or alternatively, a base station may perform aspects of the functions described below using special-purpose hardware.

At 2005, the base station may generate a first grant allocating first resources of a channel or signal within a first TTI of a set of different TTIs and a second grant allocating second resources of the channel or signal within a second TTI of the set of different TTIs. The operations of 2005 may be performed according to the methods described herein. In some examples, aspects of the operations of 2005 may be performed by a grant generation component as described with reference to FIGS. 13 to 16.

At 2010, the base station may transmit the first grant and the second grant within a CORESET of the first TTI, the first grant being associated with a first parameter and the second grant being associated with a second parameter that is different than the first parameter. The operations of 2010 may be performed according to the methods described herein. In some examples, aspects of the operations of 2010 may be performed by a grant transmission component as described with reference to FIGS. 13 to 16.

At 2015, the base station may transmit a payload in the first resources of the first TTI using a first SSB beam and in the second resources of the second TTI using a second SSB beam. The operations of 2015 may be performed according to the methods described herein. In some examples, aspects of the operations of 2015 may be performed by a payload transmission component as described with reference to FIGS. 13 to 16.

Embodiment 1: A method of wireless communication at a UE, comprising: monitoring, via a receive beam, a first TTI of a plurality of different TTIs for a control resource set; decoding the control resource set to obtain a first grant and a second grant; determining that the first grant and the second grant are associated with different parameters mapped to the control resource set based at least in part on decoding multiple grants from the control resource set; and decoding, during at least one of the first TTI and a second TTI of the plurality different TTIs, resources of a channel or signal indicated in at least one of the first grant and the second grant.

Embodiment 2: The method of embodiment 1, wherein decoding the resources of the channel or signal further comprises: monitoring, using the receive beam, first resources of the channel or signal corresponding to the first grant during the first TTI and second resources of the channel or signal corresponding to the second grant during the second TTI.

Embodiment 3: The method of embodiment 2, wherein decoding the resources of the channel or signal further comprises: decoding the first resources of the channel or signal corresponding to the first grant; and decoding the second resources of the channel or signal corresponding to the second grant.

Embodiment 4: The method of any of embodiments 1 to 3, wherein a first parameter of the different parameters is that the first grant has a spatial QCL relationship with a first SSB beam and/or a first reference signal, and a second parameter of the different parameters is that the second grant has a spatial QCL relationship with a second SSB beam and/or a second reference signal that is different than the first SSB beam and/or the first reference signal.

Embodiment 5: The method of embodiment 4, wherein decoding the resources of the channel or signal further comprises: decoding first resources of the channel or signal corresponding to the first grant during the first TTI based at least in part on the first parameter; and decoding second resources of the channel or signal corresponding to the second grant during the second TTI based at least in part on the second parameter.

Embodiment 6: The method of embodiment 4, wherein decoding the resources of the channel or signal further comprises: setting at least one beam parameter of a first receive beam based at least in part on the first parameter and at least one beam parameter of a second receive beam based at least in part on the second parameter; monitoring first resources of the channel or signal during the first TTI using the first receive beam and second resources of the channel or signal during the second TTI using the second receive beam; and decoding the first resources of the channel or signal based at least in part on the first parameter and the second resources of the channel or signal based at least in part on the second parameter.

Embodiment 7: The method of any of embodiments 1 to 6, further comprising: determining a location of the first grant within the control resource set and a location of the second grant within the control resource set; determining that a first parameter of the different parameters corresponds to the first TTI based at least in part on the location of the first grant; and determining that a second parameter of the different parameters corresponds to the second TTI based at least in part on the location of the second grant.

Embodiment 8: The method of embodiment 7, wherein decoding the resources of the channel or signal further comprises: decoding first resources of the channel or signal corresponding to the first grant during the first TTI based at least in part on the first parameter; and decoding second resources of the channel or signal corresponding to the second grant during the second TTI based at least in part on the second parameter.

Embodiment 9: The method of any of embodiments 7 to 8, wherein the location of the first grant and the location of the second grant respectively correspond to different CCE indexes.

Embodiment 10: The method of any of embodiments 7 to 9, wherein the location of the first grant and the location of the second grant respectively correspond to different time and frequency resources within the control resource set.

Embodiment 11: The method of any of embodiments 1 to 10, further comprising: determining that a first parameter of the different parameters corresponds to the first TTI based at least in part on the first TTI occurring before the second TTI; and determining that a second parameter of the different parameters corresponds to the second TTI based at least in part on the second TTI occurring after the first TTI.

Embodiment 12: The method of any of embodiments 1 to 11, further comprising: determining that a first parameter of the different parameters corresponds to the first TTI based at least in part on the first grant allocating first resources of the channel or signal within the first TTI; and determining that a second parameter of the different parameters corresponds to the second TTI based at least in part on the second grant allocating second resources of the channel or signal within the second TTI.

Embodiment 13: The method of any of embodiments 1 to 12, further comprising: estimating a first channel parameter for a first DMRS within the control resource set associated with the first grant and a second channel parameter for a second DMRS within the control resource set associated with the second grant; determining that a first parameter of the different parameters corresponds to the first TTI based at least in part on the first channel parameter and the second channel parameter; and determining that a second parameter of the different parameters corresponds to the second TTI based at least in part on the first channel parameter and the second channel parameter.

Embodiment 14: The method of embodiment 13, wherein each of the first channel parameter and the second channel parameter is SNR estimate, an SINR estimate, or both.

Embodiment 15: The method of any of embodiments 13 to 14, further comprising: determining not to decode the resources of the channel or signal during one of the first TTI or the second TTI based at least in part on the first channel parameter or the second channel parameter.

Embodiment 16: The method of any of embodiments 13 to 15, further comprising: determining to decode first resources of the channel or signal during the first TTI and second resources of the channel or signal during the second TTI based at least in part on the first channel parameter or the second channel parameter.

Embodiment 17: The method of any of embodiments 13 to 16, further comprising: determining which of the first parameter or the second parameter is associated with the first grant based at least in part on the first channel parameter and the second channel parameter.

Embodiment 18: The method of any of embodiments 13 to 17, wherein decoding the control resource set to obtain the first grant and the second grant further comprises: decoding the control resource set to obtain the first grant and the second grant in accordance with one of the first parameter or the second parameter.

Embodiment 19: The method of any of embodiments 1 to 18, wherein a beam index of a first SSB beam corresponds to a first parameter of the different parameters and a beam index of a second SSB beam corresponds to a second parameter of the different parameters.

Embodiment 20: The method of any of embodiments 1 to 19, wherein a payload is transported in the channel or signal via a first SSB beam during the first TTI and via a second SSB beam during the second TTI.

Embodiment 21: The method of embodiment 20, wherein the payload comprises an RMSI payload.

Embodiment 22: The method of any of embodiments 20 to 21, further comprising: transmitting acknowledgement feedback indicating whether decoding of the payload was successful.

Embodiment 23: The method of any of embodiments 1 to 22, wherein decoding the control resource set further comprises: decoding a plurality of decoding candidates within a common search space corresponding to the control resource set to obtain the first grant and the second grant.

Embodiment 24: The method of any of embodiments 1 to 23, further comprising: determining that a first parameter of the different parameters corresponds to the first TTI based at least in part on the first grant allocating first resources of the channel or signal within the first TTI that are frequency division multiplexed with a first SSB; and determining that a second parameter of the different parameters corresponds to the second TTI based at least in part on the second grant allocating second resources of the channel or signal within the second TTI that are frequency division multiplexed with a first SSB.

Embodiment 25: The method of any of embodiments 1 to 24, wherein the different parameters indicate different spatial QCL assumptions.

Embodiment 26: A method of wireless communication at a base station, comprising: generating a first grant allocating first resources of a channel or signal within a first TTI of a plurality of different TTIs and a second grant allocating second resources of the channel or signal within a second TTI of the plurality of different TTIs; and transmitting the first grant and the second grant within a control resource set of the first TTI, the first grant being associated with a first parameter and the second grant being associated with a second parameter that is different than the first parameter.

Embodiment 27: The method of embodiment 26, further comprising: transmitting a payload in the first resources of the first TTI using a first SSB beam and in the second resources of the second TTI using a second SSB beam.

Embodiment 28: The method of any of embodiments 26 or 27, wherein the first parameter is that the first grant has a spatial quasi-colocation (QCL) relationship with a first synchronization signal block (SSB) beam and/or a first reference signal, and the second parameter is that the second grant has a spatial QCL relationship with a second SSB beam and/or a second reference signal that is different than the first SSB beam and/or the first reference signal.

Embodiment 29: An apparatus comprising at least one means for performing a method of any of embodiments 1 to 25.

Embodiment 30: An apparatus comprising at least one means for performing a method of any of embodiments 26 to 28.

Embodiment 31: An apparatus for wireless communications comprising a processor; memory in electronic communication with the processor; and instructions stored in the memory and executable by the processor to cause the apparatus to perform a method of any of embodiments 1 to 25.

Embodiment 32: An apparatus for wireless communications comprising a processor; memory in electronic communication with the processor; and instructions stored in the memory and executable by the processor to cause the apparatus to perform a method of any of embodiments 26 to 28.

Embodiment 33: A non-transitory computer-readable medium storing code for wireless communications, the code comprising instructions executable by a processor to perform a method of any of embodiments 1 to 25.

Embodiment 34: A non-transitory computer-readable medium storing code for wireless communications, the code comprising instructions executable by a processor to perform a method of any of embodiments 26 to 28.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring, via a receive beam, a first transmission time interval (TTI) of a plurality of different TTIs for a control resource set;
    decoding, from the first TTI, the control resource set to obtain a first grant and a second grant;
    determining, based at least in part on decoding multiple grants from the control resource set, that the first grant has a first spatial quasi-colocation (QCL) relationship with a first synchronization signal block (SSB) beam or a first reference signal, and that the second grant has a second spatial QCL relationship with a second SSB beam or a second reference signal that is different from the first SSB beam or the first reference signal, wherein the first spatial QCL relationship and the second spatial QCL relationship are different; and
    decoding, during at least one of the first TTI and a second TTI of the plurality different TTIs, resources of a channel or signal indicated in at least one of the first grant in accordance with the first spatial QCL relationship and the second grant in accordance with the second spatial QCL relationship.

2. The method of claim 1, further comprising:
    monitoring first resources of the channel or signal corresponding to the first grant during the first TTI and second resources of the channel or signal corresponding to the second grant during the second TTI.

3. The method of claim 2, wherein decoding the resources of the channel or signal further comprises:
    decoding the first resources of the channel or signal corresponding to the first grant; and
    decoding the second resources of the channel or signal corresponding to the second grant.

4. The method of claim 1, wherein decoding the resources of the channel or signal further comprises:
    decoding first resources of the channel or signal corresponding to the first grant during the first TTI based at least in part on the first spatial QCL relationship; and
    decoding second resources of the channel or signal corresponding to the second grant during the second TTI based at least in part on the second spatial QCL relationship.

5. The method of claim 1, wherein decoding the resources of the channel or signal further comprises:
    setting at least one beam parameter of a first receive beam based at least in part on the first spatial QCL relationship and at least one beam parameter of a second receive beam based at least in part on the second spatial QCL relationship;
    monitoring first resources of the channel or signal during the first TTI using the first receive beam and second resources of the channel or signal during the second TTI using the second receive beam; and
    decoding the first resources of the channel or signal based at least in part on the first spatial QCL relationship and the second resources of the channel or signal based at least in part on the second spatial QCL relationship.

6. The method of claim 1, further comprising:
    determining a location of the first grant within the control resource set and a location of the second grant within the control resource set;
    determining that the first spatial QCL relationship corresponds to the first TTI based at least in part on the location of the first grant; and
    determining that the second spatial QCL relationship corresponds to the second TTI based at least in part on the location of the second grant.

7. The method of claim 6, wherein decoding the resources of the channel or signal further comprises:
    decoding first resources of the channel or signal corresponding to the first grant during the first TTI based at least in part on the first spatial QCL relationship; and
    decoding second resources of the channel or signal corresponding to the second grant during the second TTI based at least in part on the second spatial QCL relationship.

8. The method of claim 6, wherein the location of the first grant and the location of the second grant respectively correspond to different control channel element (CCE) indexes.

9. The method of claim 6, wherein the location of the first grant and the location of the second grant respectively correspond to different time and frequency resources within the control resource set.

10. The method of claim 1, further comprising:
    determining that the first spatial QCL relationship corresponds to the first TTI based at least in part on the first TTI occurring before the second TTI; and
    determining that the second spatial QCL relationship corresponds to the second TTI based at least in part on the second TTI occurring after the first TTI.

11. The method of claim 1, further comprising:
    determining that the first spatial QCL relationship corresponds to the first TTI based at least in part on the first grant allocating first resources of the channel or signal within the first TTI; and
    determining that the second spatial QCL relationship corresponds to the second TTI based at least in part on the second grant allocating second resources of the channel or signal within the second TTI.

12. The method of claim 1, further comprising:
estimating a first channel parameter for a first demodulation reference signal (DMRS) within the control resource set associated with the first grant and a second channel parameter for a second DMRS within the control resource set associated with the second grant;
determining that the first spatial QCL relationship corresponds to the first TTI based at least in part on the first channel parameter and the second channel parameter; and
determining that the second spatial QCL relationship corresponds to the second TTI based at least in part on the first channel parameter and the second channel parameter.

13. The method of claim 12, wherein each of the first channel parameter and the second channel parameter is signal to noise ratio (SNR) estimate, a signal to interference plus noise (SINR) estimate, or both.

14. The method of claim 12, further comprising:
determining not to decode the resources of the channel or signal during one of the first TTI or the second TTI based at least in part on the first channel parameter or the second channel parameter.

15. The method of claim 12, further comprising:
determining to decode first resources of the channel or signal during the first TTI and second resources of the channel or signal during the second TTI based at least in part on the first channel parameter or the second channel parameter.

16. The method of claim 12, further comprising:
determining which of the first spatial QCL relationship or the second spatial QCL relationship is associated with the first grant based at least in part on the first channel parameter and the second channel parameter.

17. The method of claim 12, wherein decoding the control resource set to obtain the first grant and the second grant further comprises:
decoding the control resource set to obtain the first grant and the second grant in accordance with one of the first spatial QCL relationship or the second spatial QCL relationship.

18. The method of claim 1, wherein a beam index of the first SSB beam corresponds to the first spatial QCL relationship and a beam index of the second SSB beam corresponds to the second spatial QCL relationship.

19. The method of claim 1, wherein a payload is transported in the channel or signal via the first SSB beam during the first TTI and via the second SSB beam during the second TTI.

20. The method of claim 19, wherein the payload comprises a remaining minimum system information (RMSI) payload.

21. The method of claim 19, further comprising:
transmitting acknowledgement feedback indicating whether decoding of the payload was successful.

22. The method of claim 1, wherein decoding the control resource set further comprises:
decoding a plurality of decoding candidates within a common search space corresponding to the control resource set to obtain the first grant and the second grant.

23. The method of claim 1, further comprising:
determining that the first spatial QCL relationship corresponds to the first TTI based at least in part on the first grant allocating first resources of the channel or signal within the first TTI that are frequency division multiplexed with the first SSB; and
determining that the second spatial QCL relationship corresponds to the second TTI based at least in part on the second grant allocating second resources of the channel or signal within the second TTI that are frequency division multiplexed with the second SSB.

24. A method for wireless communication at a base station, comprising:
generating a first grant allocating first resources of a channel or signal within a first transmission time interval (TTI) of a plurality of different TTIs and a second grant allocating second resources of the channel or signal within a second TTI of the plurality of different TTIs; and
transmitting the first grant and the second grant within a control resource set of the first TTI, the first grant having a first spatial quasi-colocation (QCL) relationship with a first synchronization signal block (SSB) beam or a first reference signal, and the second grant having a second spatial QCL relationship with a second SSB beam or a second reference signal that is different from the first SSB beam or the first reference signal, wherein the first spatial QCL relationship and the second spatial QCL relationship are different.

25. The method of claim 24, further comprising:
transmitting a payload in the first resources of the first TTI using the first SSB beam and in the second resources of the second TTI using the second SSB beam.

26. The method of claim 24, further comprising:
determining that the first grant and the second grant are associated with different spatial QCL relationships mapped to the control resource set; and
generating the first grant and the second grant to schedule transmission of a payload in multiple different TTIs of the plurality of different TTIs.

27. An apparatus for wireless communication at a user equipment (UE), comprising:
a processor,
memory coupled with the processor; and
instructions stored in the memory and operable, when executed by the processor, to cause the apparatus to:
monitor, via a receive beam, a first transmission time interval (TTI) of a plurality of different TTIs for a control resource set;
decode, from the first TTI, the control resource set to obtain a first grant and a second grant;
determine, based at least in part on decoding multiple grants from the control resource set, that the first grant has a first spatial quasi-colocation (QCL) relationship with a first synchronization signal block (SSB) beam or a first reference signal, and that the second grant has a second spatial QCL relationship with a second SSB beam or a second reference signal that is different from the first SSB beam or the first reference signal, wherein the first spatial QCL relationship and the second spatial QCL relationship are different; and
decode, during at least one of the first TTI and a second TTI of the plurality different TTIs, resources of a channel or signal indicated in at least one of the first grant in accordance with the first spatial QCL relationship and the second grant in accordance with the second spatial QCL relationship.

28. An apparatus for wireless communication at a base station, comprising:
a processor,
memory coupled with the processor; and instructions stored in the memory and operable, when executed by the processor, to cause the apparatus to:

generate a first grant allocating first resources of a channel or signal within a first transmission time interval (TTI) of a plurality of different TTIs and a second grant allocating second resources of the channel or signal within a second TTI of the plurality of different TTIs; and transmit the first grant and the second grant within a control resource set of the first TTI, the first grant having a first spatial quasi-colocation (QCL) relationship with a first synchronization signal block (SSB) beam or a first reference signal, and the second grant having a second spatial QCL relationship with a second SSB beam or a second reference signal that is different from the first SSB beam or the first reference signal, wherein the first spatial QCL relationship and the second spatial QCL relationship are different.

* * * * *